US008587840B2

(12) United States Patent
Ito et al.

(10) Patent No.: US 8,587,840 B2
(45) Date of Patent: Nov. 19, 2013

(54) IMAGE READING APPARATUS

(75) Inventors: Tetsuo Ito, Nagoya (JP); Tsutomu Hida, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 259 days.

(21) Appl. No.: 13/069,747

(22) Filed: Mar. 23, 2011

(65) Prior Publication Data

US 2011/0235140 A1    Sep. 29, 2011

(30) Foreign Application Priority Data

Mar. 25, 2010   (JP) .................................. 2010-069862

(51) Int. Cl.
*H04N 1/04* (2006.01)

(52) U.S. Cl.
USPC ............ 358/474; 358/496; 358/497; 358/498

(58) Field of Classification Search
USPC .................................. 358/474, 496, 497, 498
See application file for complete search history.

(56) References Cited

U.S. PATENT DOCUMENTS

| 6,909,048 B2 | 6/2005 | Yamanaka et al. |
| 7,239,825 B2 | 7/2007 | Ohama et al. |
| 7,428,081 B2 | 9/2008 | Yamauchi |
| 7,684,091 B2 | 3/2010 | Takata et al. |
| 7,751,099 B2 | 7/2010 | Mizuhashi et al. |
| 8,262,048 B2 | 9/2012 | Ikeno et al. |
| 8,270,045 B2 * | 9/2012 | Iwata ............................ 358/497 |
| 8,294,692 B2 | 10/2012 | Tsai et al. |
| 8,294,957 B2 | 10/2012 | Kanda |
| 2003/0137700 A1 | 7/2003 | Kelsay |
| 2004/0056926 A1 | 3/2004 | Samoto |
| 2004/0238199 A1 * | 12/2004 | Yamanaka et al. ........... 174/68.1 |
| 2004/0247337 A1 | 12/2004 | Ohama et al. |
| 2005/0122544 A1 | 6/2005 | Mizuhashi et al. |
| 2005/0219658 A1 | 10/2005 | Miyahara |
| 2006/0181747 A1 | 8/2006 | Takata et al. |
| 2006/0216098 A1 | 9/2006 | Lyman |

(Continued)

FOREIGN PATENT DOCUMENTS

| CN | 1512274 A | 7/2004 |
| CN | 1573589 A | 2/2005 |

(Continued)

OTHER PUBLICATIONS

Extended European Search Report for application No. 11002321.5 mailed Aug. 19, 2011.

(Continued)

*Primary Examiner* — Houshang Safaipour
(74) *Attorney, Agent, or Firm* — Banner & Witcoff, Ltd.

(57) ABSTRACT

An image reading apparatus may include a cable for connecting a reading device to a controller configured to perform functions and execute instructions. To prevent breakage and stress on the cable, the cable may be fixed to a guide component. For example, the cable may be fixed to the guide component on a first side and be held by the component such that the cable includes a generally U-shaped slacked portion. According to one or more arrangements, the guide component may include an escape portion that allows for the movement of an openable unit of the image reading apparatus. In yet other aspects, the guide component may be attachable/detachable from a main body of the image reading apparatus.

13 Claims, 15 Drawing Sheets

(56) References Cited

U.S. PATENT DOCUMENTS

| | | |
|---|---|---|
| 2007/0047024 A1 | 3/2007 | Onose et al. |
| 2007/0059963 A1 | 3/2007 | Chen et al. |
| 2007/0201109 A1 | 8/2007 | Osakabe et al. |
| 2008/0013133 A1 | 1/2008 | Taguchi |
| 2008/0316547 A1 | 12/2008 | Kim |
| 2010/0265537 A1 | 10/2010 | Park et al. |
| 2012/0113582 A1 | 5/2012 | Hirano et al. |

FOREIGN PATENT DOCUMENTS

| | | | |
|---|---|---|---|
| CN | 1625207 | A | 6/2005 |
| CN | 1822634 | A | 8/2006 |
| JP | 2001057611 | A | 2/2001 |
| JP | 2001197232 | A | 7/2001 |
| JP | 2002199156 | A | 7/2002 |
| JP | 2003241443 | A | 8/2003 |
| JP | 2004096321 | A | 3/2004 |
| JP | 2004122584 | A | 4/2004 |
| JP | 2004214803 | A | 7/2004 |
| JP | 2004246773 | A | 9/2004 |
| JP | 2006315264 | A | 11/2006 |
| JP | 2007316103 | A | 12/2007 |
| JP | 2008022254 | A | 1/2008 |
| JP | 2008092060 | A | 4/2008 |
| JP | 2009260476 | A | 11/2009 |

OTHER PUBLICATIONS

Electronic Acknowledgement Receipt, Specification and Drawings for U.S. Appl. No. 13/069,680, filed Mar. 23, 2011.
Electronic Acknowledgement Receipt, Specification and Drawings for U.S. Appl. No. 13/069,723, filed Mar. 23, 2011.
Decision to Grant a Patent for Japanese patent application No. 2010-069862 mailed Feb. 7, 2012.
Decision to Grant a Patent for Japanese patent application No. 2010-069838 mailed Feb. 7, 2012.
Notice of Reasons for Rejection for Japanese patent application No. 2010-069819 mailed Feb. 7, 2012.
Extended European search report for application No. 11002320.7 mailed Jun. 27, 2011.
Extended European Search Report for application No. 11002319.9 mailed Jun. 30, 2011.
Office Action corresponding U.S. Appl. No. 13/069,723 mailed on Jan. 18, 2013.
Non-final Office Action received in U.S. Appl. No. 13/069,680 mailed May 7, 2013.
Notice of Allowance issued in corresponding U.S. Appl. No. 13/069,723, mailed Jun. 17, 2013.
Office Action issued in corresponding Chinese Patent Application No. 201110084658.1 mailed May 29, 2013.
Office Action issued in corresponding Chinese Patent Application No. 201110084643.5 mailed May 16, 2013.
Office Action issued in corresponding Chinese Patent Application No. 201110084666.6 mailed May 6, 2013.

* cited by examiner

IMAGE READING APPARATUS

CROSS REFERENCE TO RELATED APPLICATION

This application claims priority from Japanese Patent Application No. 2010-069862, filed on Mar. 25, 2010, the entire subject matter and content of which is incorporated herein by reference.

TECHNICAL FIELD

Aspects of the invention relate to an image reading apparatus.

BACKGROUND

A known image reading apparatus includes a main unit and an openable unit which is configured to pivotally and vertically move relative to the main unit.

The openable unit includes a document tray on which a document is placed, and a feeder that feeds the document along a feed path. The main unit includes a reading portion which is disposed facing the feed path and configured to read an image of a document passing through the feed path, and a processing portion which is configured to perform controls regarding operations of at least the feeder and the reading portion.

The image reading apparatus includes a cable electrically connecting the openable unit and the processing portion of the main unit. The cable extends downward from the openable unit and is inserted inside the main unit. The main unit includes a recessed portion that is disposed near a place where the main unit is connected to the openable unit. The recessed portion is configured to accommodate the cable being bent. The recessed portion is designed to reduce exposure of the cable and to cause the cable to follow the pivotal or vertical movement of the openable unit relative to the main unit.

In the image reading apparatus, the feeder, the reading portion, and the processing portion operate under control of the control circuit board, and an image reading process that reads an image of a document passing the feed path is performed.

In the image reading apparatus, a thick cable is used to electrically connect the openable unit and the processing portion of the main unit. However, the cable has been recently substituted for a flexible flat cable of which a plurality of coated wires are united to form a flat shape.

However, the flexible flat cable is generally likely to be twisted and bent. Even if the flexible flat cable can be accommodated in the recessed portion in the bent state, when the openable unit pivotally or vertically moves relative to the main unit, the flexible flat cable is likely to sustain excessive twist and bend, which may result in undesired problems such as break or noise in a signal to be transmitted by the flexible flat cable. As a result, irregularity in image data for a document may occur in an image reading process.

SUMMARY

Aspects of the disclosure may provide an image reading apparatus having one or more components configured to guide movements and positions of a cable configured to convey signals from a reading component to a controller.

BRIEF DESCRIPTION OF THE DRAWINGS

Illustrative aspects of the invention will be described in detail with reference to the following figures in which like elements are labeled with like numbers and in which.

DETAILED DESCRIPTION

An illustrative embodiment of the invention will be described in detail with reference to the accompanying drawings.

Figure 1:
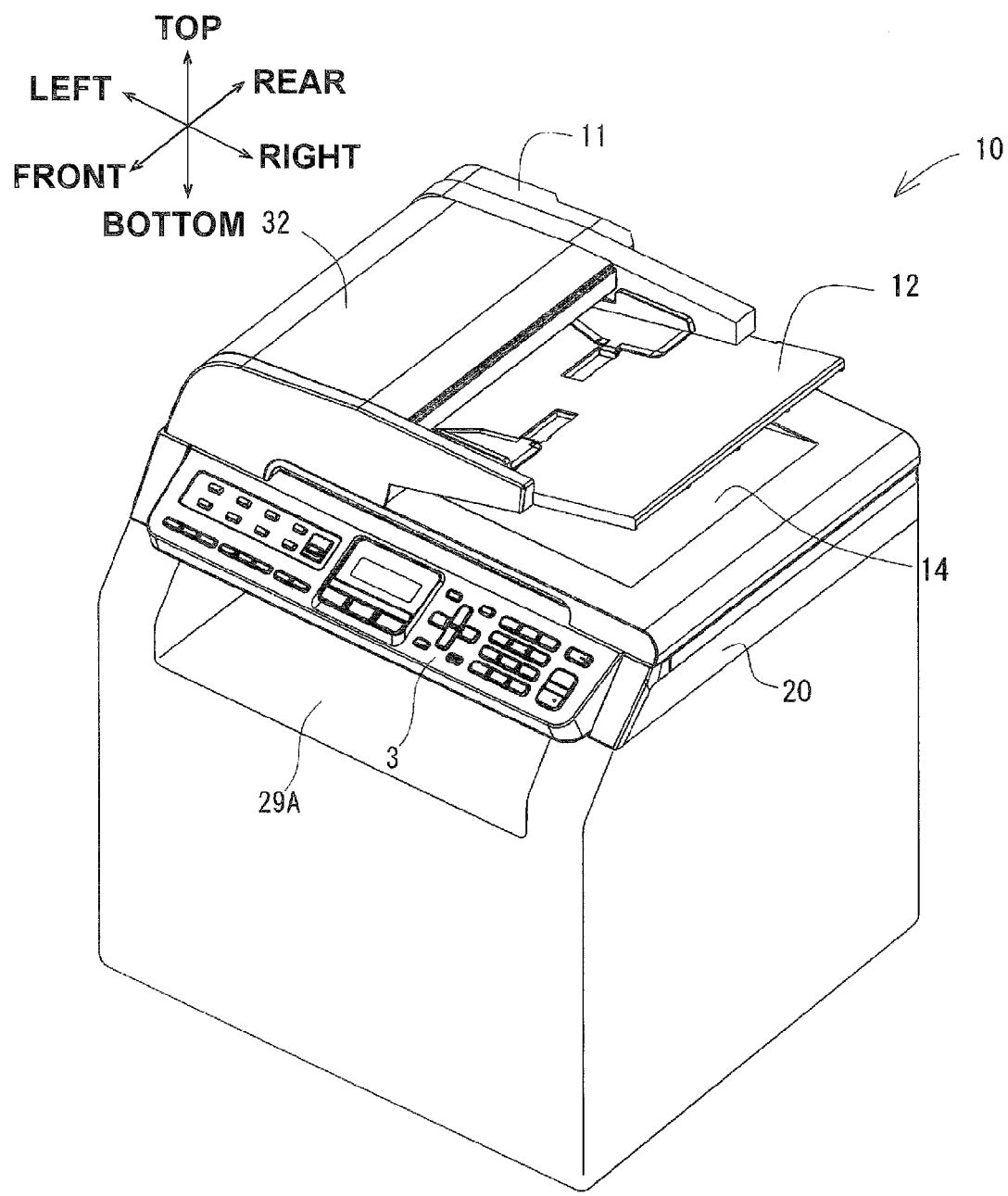
FIG. 1 is a perspective view of a multifunction apparatus according to an illustrative embodiment, in which an automatic document feeder (ADF) is in a closed state.

As shown in FIG. 1, a multifunction apparatus 10 is capable of performing a variety of functions and operations including an image reading process in which an image of a document is read and converted into electronic data, an image forming process in which an image is formed on a recording medium (e.g. a sheet of paper or transparency) based on the electronic data, a communication process where the electronic data is transmitted to and received from an external device, and other processes. In a particular example, when the image reading process is activated, executed or used, the multifunction apparatus 10 may operate as an image reading apparatus. In FIG. 1, a side of the multifunction apparatus 10 having an operation panel 3 is referred to as the front or front side of the multifunction apparatus 10, and an opposite side is referred to as the rear or rear side of the multifunction apparatus 10. The top or upper side, the bottom or lower side, the left or left side, the right or right side, the front or front side, and the rear or rear side of the multifunction apparatus 10 are identified as indicated by the arrows in FIG. 1. With regard to various individual objects of the multifunction apparatus 1, sides of the individual objects are similarly identified (e.g., based on the arrows shown in FIG. 1) based on the arranged/ attached position of the object on/in the multifunction apparatus 10.

The general structure of the example multifunction apparatus 10 will be described.

As shown in FIGS. 1-5, the multifunction apparatus 10 may include multiple portions including a main unit 20, and an automatic document feeder (ADF) 11. The ADF 11 is an example of an openable unit or apparatus as described in this disclosure.

As shown in the illustrative embodiment of FIGS. 1-4, the ADF 11 is disposed above the main unit 20 so as to cover the top surface of the main unit 20. As shown in FIGS. 2-5, a pair of supporting members, e.g. hinge members 49R and 49L, are disposed between an upper end of the rear side of the main unit 20 and a lower end of the rear side of the ADF 11 and spaced apart from each other in the right-left direction. The ADF 11 is configured to pivot around a rotation axis R1 extending in the right-left direction via the hinge members 49R and 49L and with respect to the main unit 20. By raising or lowering the front portion of the ADF 11 (e.g., opposite the side on which the hinge members 49R and 49L are disposed), the ADF 11 is configured to move between an open state relative to the main unit 20 shown in FIG. 1 and a closed state shown in FIG. 5. In one example, when the ADF 11 is in the open state, the top surface of the main unit 20 is at least partially exposed. In some arrangements, the top surface of the main unit 20 is entirely exposed when ADF 11 is moved to the open state or position.

Figure 3:
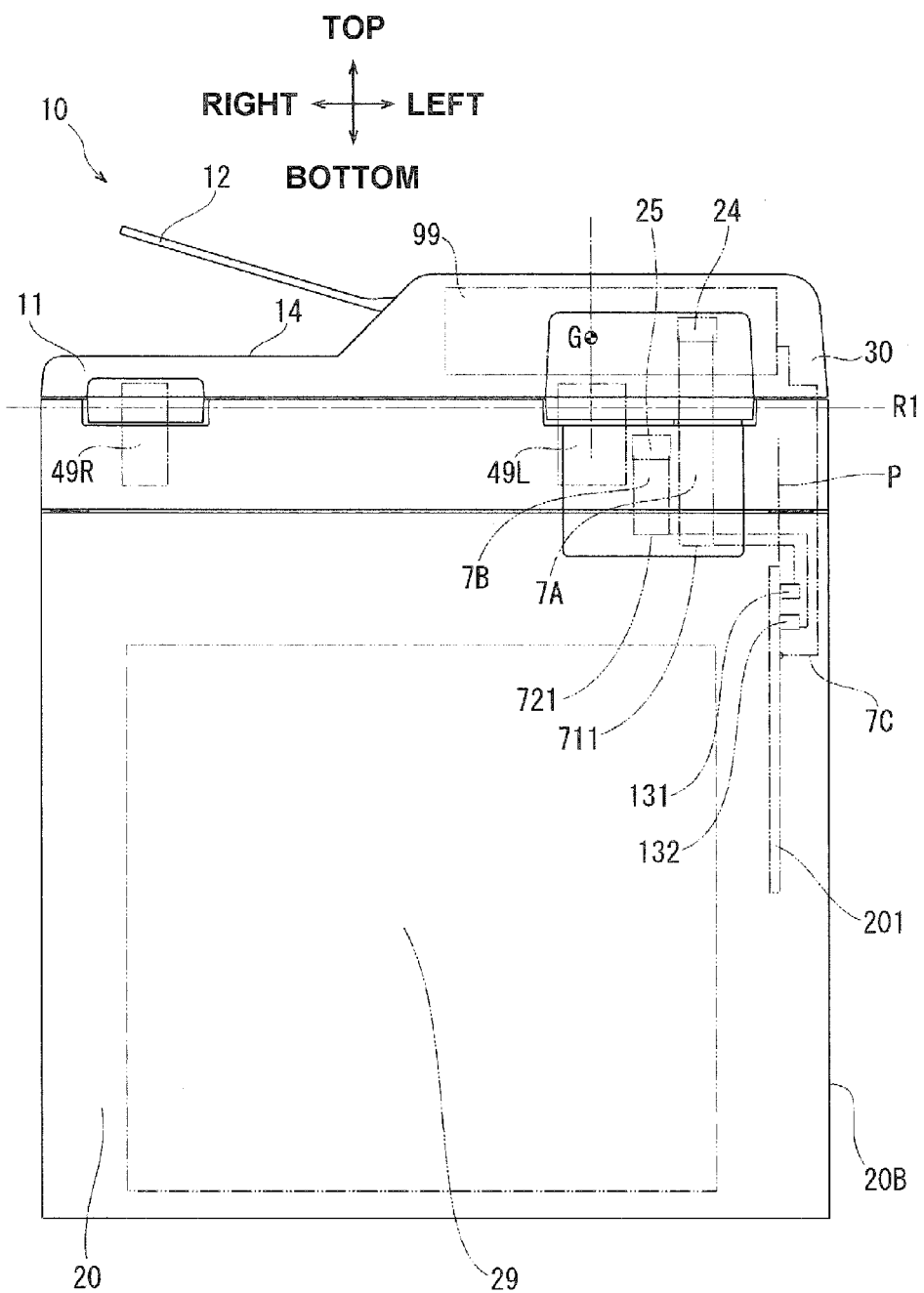
FIG. 3 is a rear view of the multifunction apparatus of FIG. 1.

In the illustrated embodiment, while the hinge member 49R may correspond to a normal hinge mechanism that only permits the pivotal movement around the rotation axis R1, the hinge member 49L may include a known free stop function (not shown). The free stop function allows the ADF 11 to be brought to a stop at an angle between the open state and the closed state (e.g., without a user having to physically hold the ADF 11 at the angle). The ADF 11 has center of gravity G shifted to the left as shown in FIG. 3 because a feeder 42 is located on the left side. Thus, the hinge member 49L having the free stop function is located vertically downward with respect to a line passing through the center of gravity G and extending in the front-rear direction. When viewed from the rear side of the main unit 20 and the ADF 11, the hinge member 49L having the free stop function is located along the vertical axis of the center of gravity G (e.g., vertically aligned with the center of gravity G). With this location, the hinge member 49L supports the weight of the ADF 11 in balance, which facilitates the movement of the ADF 11 between the open state and the closed state. The free stop function of hinge member 49L further allows the ADF 11 to stop (e.g., self-support) at an angle during movement between the open state and the closed state. This improves a degree of ease of operation by the user in moving the ADF 11 with respect to the main unit 20.

Additionally, in one or more arrangements, the hinge member 49L is separated from a left side surface 20B of the main unit 20 (along which a control circuit board 201, which will be later described, is disposed), and thus a flexible flat cable 7A and a main unit-side flexible flat cable 7B, which will also be described later, can be arranged in an unoccupied space between the hinge member 49L and the left side surface 20B.

Figure 4:
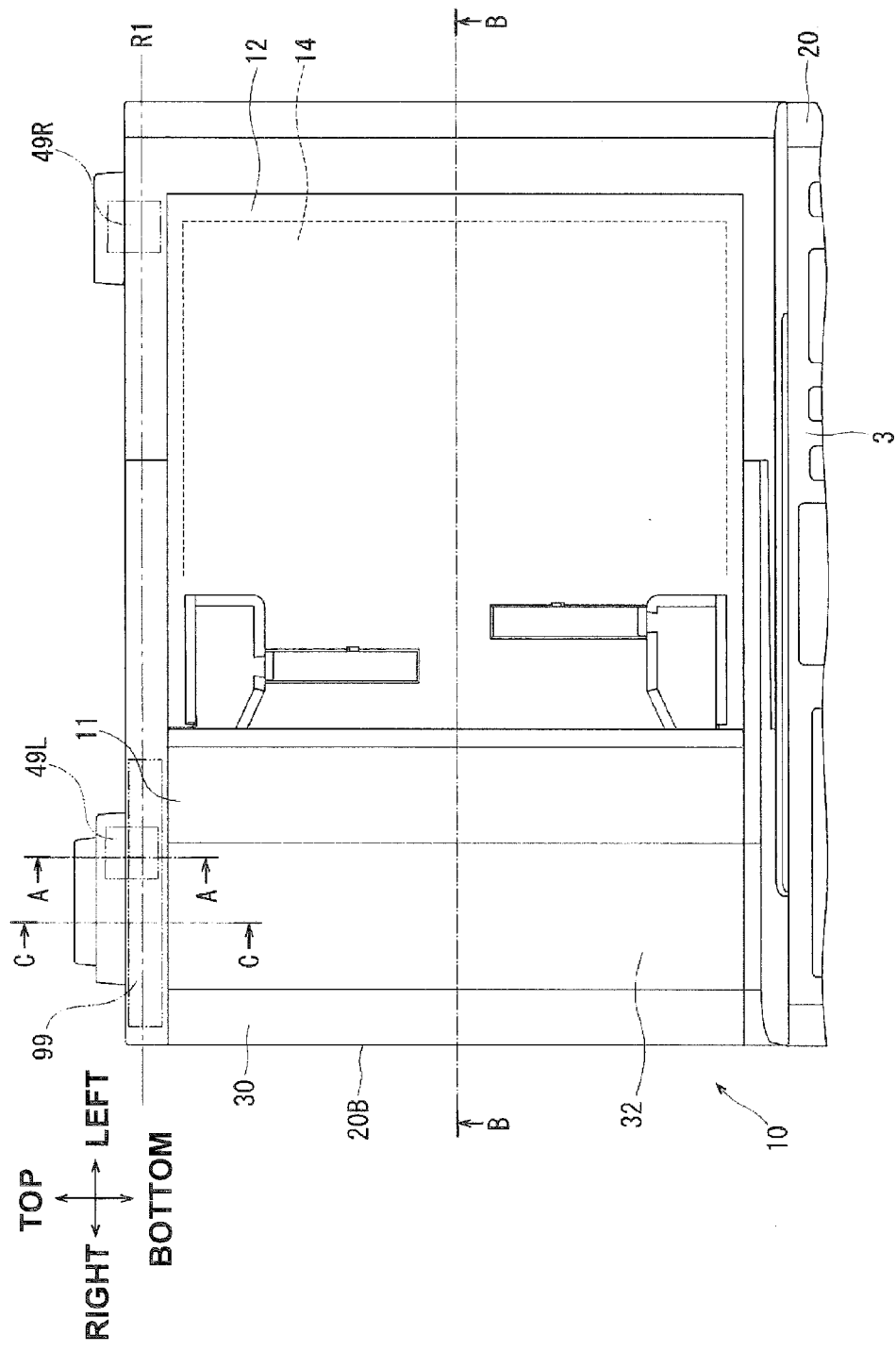
FIG. 4 is a top view of the multifunction apparatus of FIG. 1.
Figure 6:
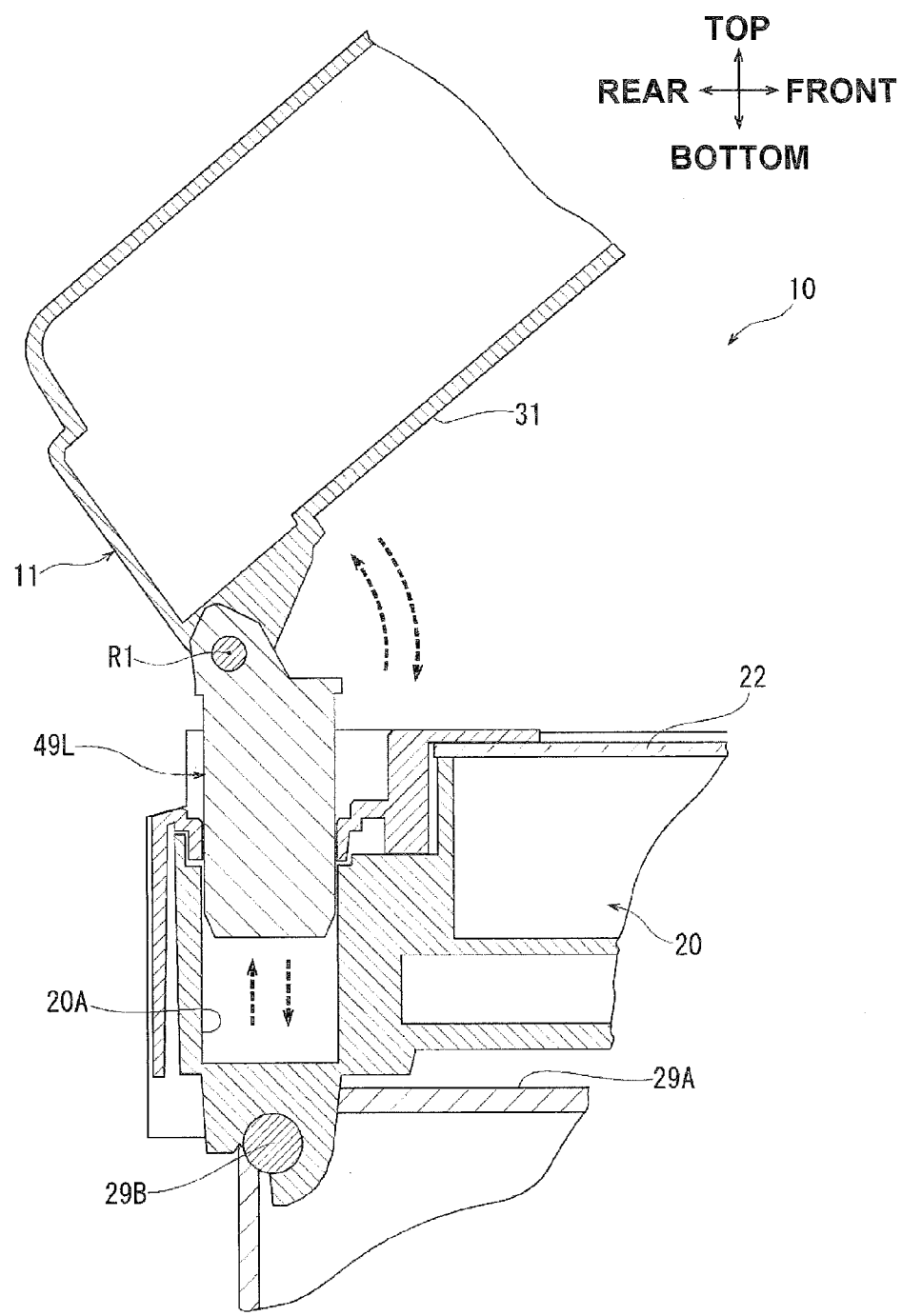
FIG. 6 is a cross sectional view of the multifunction apparatus taken along the line A-A of FIG. 4.

FIG. 6 illustrates a cross sectional view taken along line A-A of FIG. 4. As shown in FIG. 6, the hinge member 49L has a columnar portion extending downward (e.g., toward a bottom of main unit 20). This columnar portion of the hinge member 49L is inserted in a guide hole 20A that is a recessed portion extending downward from the top surface of the main unit 20 on the rear side. The configuration of the hinge member 49L inserted into guide hole 20A allows the hinge member 49L to move up and down (e.g., vertically) in the guide hole 20A relative to the main unit 20. Although not shown, the hinge member 49R may also include a columnar portion extending downward in similar fashion to the hinge member 49L. Accordingly, the columnar portion of the hinge member 49R may be inserted into another guide hole 20A recessed in the main unit 20, allowing the hinge member 49R to move up and down in the guide hole 20A relative to the main unit 20. The ADF 11, which is connected to the main unit 20 via the hinge members 49R and 49L, is thus, also capable of and configured to move up and down (e.g., vertically) relative to the main unit 20.

The main unit 20 will now be described in additional detail.

Figure 2:
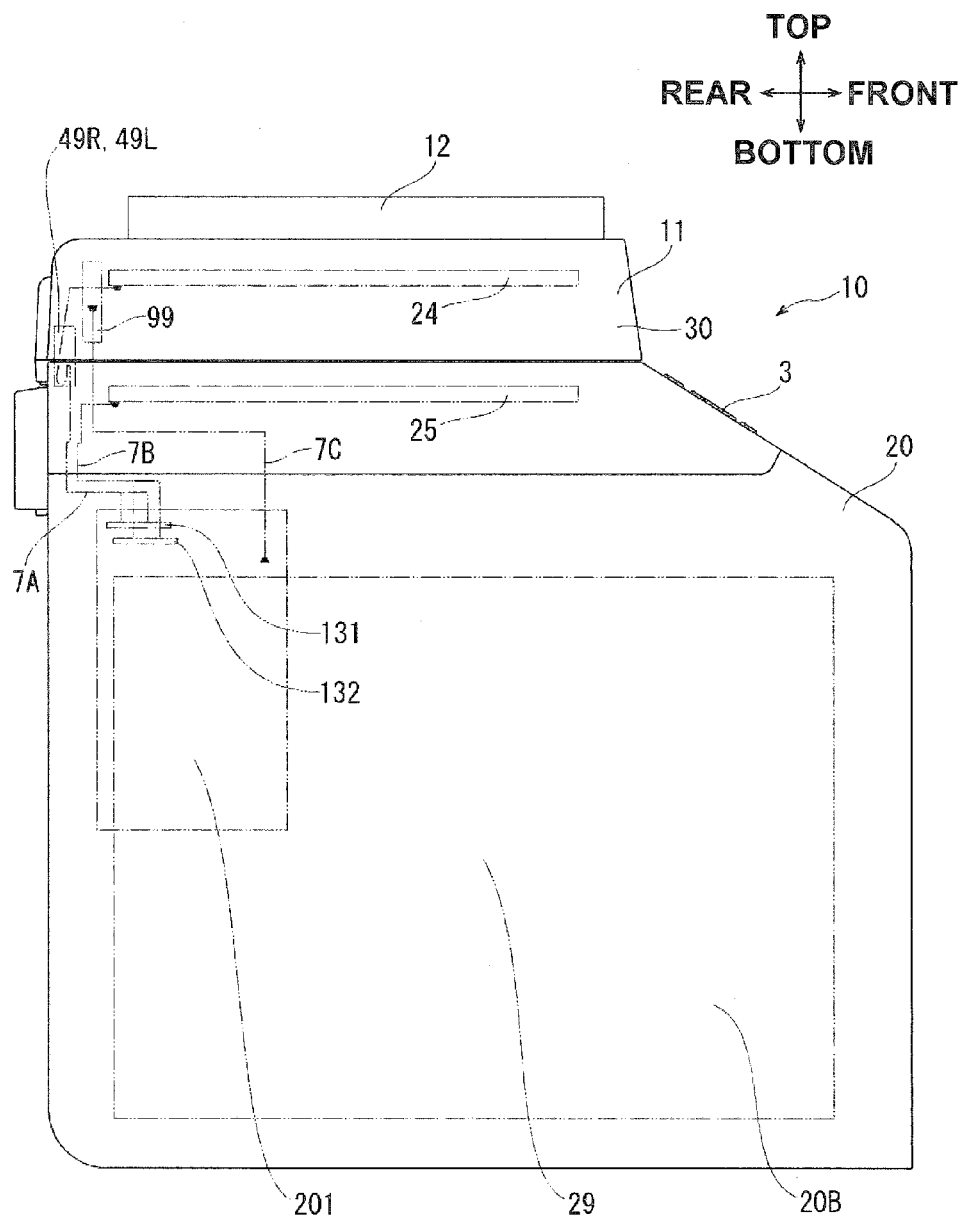
FIG. 2 is a left side view of the multifunction apparatus of FIG. 1.

As shown in FIG. 1, the front side of the main unit 20 includes the operation panel 3. The operation panel 3 is configured to receive input from a user and display a processing status of and other information relating to the multifunction apparatus 10. For example, network setup menus and information, an ink or toner level, document name, data destination identification and the like may be displayed in operation panel 3. As shown in FIGS. 2 and 3, the main unit 20 includes an image forming unit 29 that is configured to form an image on a recording medium, e.g., a sheet of paper or a transparency sheet. The image forming unit 29 may correspond to any type of image forming system including an electrophotographic type, an inkjet type, and other known types. Once an image has been formed on a recording medium by the image forming unit 29, the recording medium is ejected toward a main unit-side ejection tray 29A (FIG. 1), which opens to the front side of the main unit 20 under the operation panel 3 and extends generally horizontally toward the rear side. Although not described in detail, as shown in FIG. 6, the rear side of the main unit 20 includes a main unit-side hinge member 29B positioned generally (vertically) level with the main unit-side ejection tray 29A. An upper portion of the main unit 20 (e.g., portion of the main unit 20 above the main unit-side ejection tray 29A) is pivotally connected to a lower portion thereof (e.g., portion of the main unit 20 below the main unit-side ejection tray 29A) via the main unit-side hinge member 29B. Main unit-side ejection tray 29A may be formed by a gap between the upper portion and the lower portion of the main unit 20.

Figure 7:
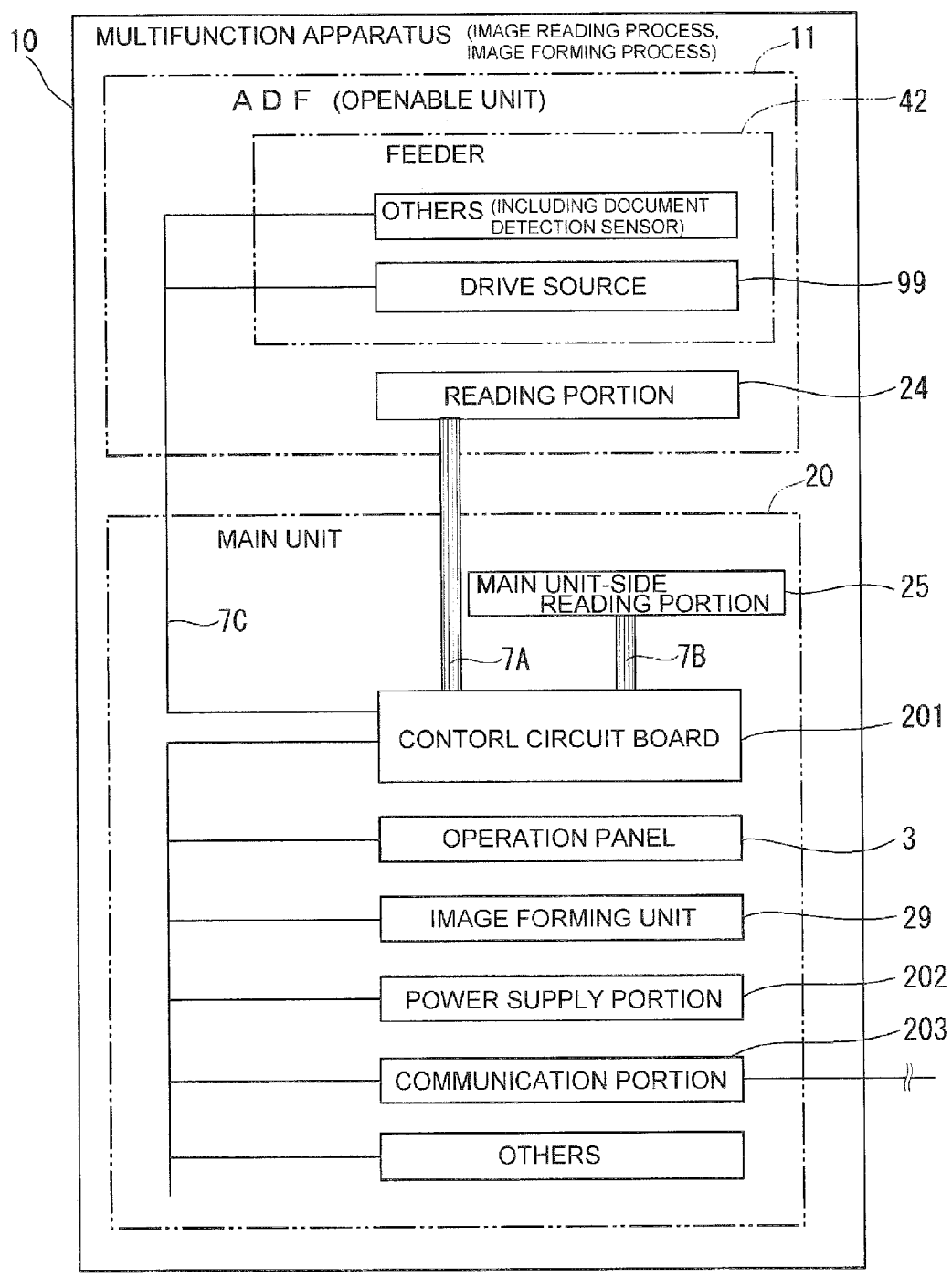
FIG. 7 is a block diagram illustrating an example internal structure of a multifunction apparatus according to one or more aspects described herein.

Referring to the block diagram of FIG. 7, the main unit 20 may include a variety of components such as a control circuit board 201 serving as a processing portion that performs controls for structural elements within the ADF 11, the operational panel 3 and image forming unit 29, a power supply portion 202 that supplies power to each structural element, and a communication portion 203 that communicates with external devices via LAN, telephone lines, and other types of wired and wireless networks (e.g., cellular networks, satellite networks, Wide Area Networks (WANs) such as the Internet).

Referring again to FIGS. 2 and 3, the control circuit board 201 is, in some embodiments, disposed inside the main unit 20 and generally parallel to a left side surface 20B of the main unit 20. To shrink or reduce the size of the apparatus, the space between the control circuit board 201 and the left side surface 20B of the main unit 20 may be narrowed. In the illustrative embodiment of FIGS. 2 and 3, a reading portion 24 is disposed closer to left side surface 20B of main unit 20 than to the right side surface of main unit 20. Additionally, since electromagnetic noise may occur from the power supply portion 202, the power supply portion 202 is at least partially shielded from electromagnetic noise and disposed apart from the control circuit board 201 and the communication portion 203.

Figure 5:
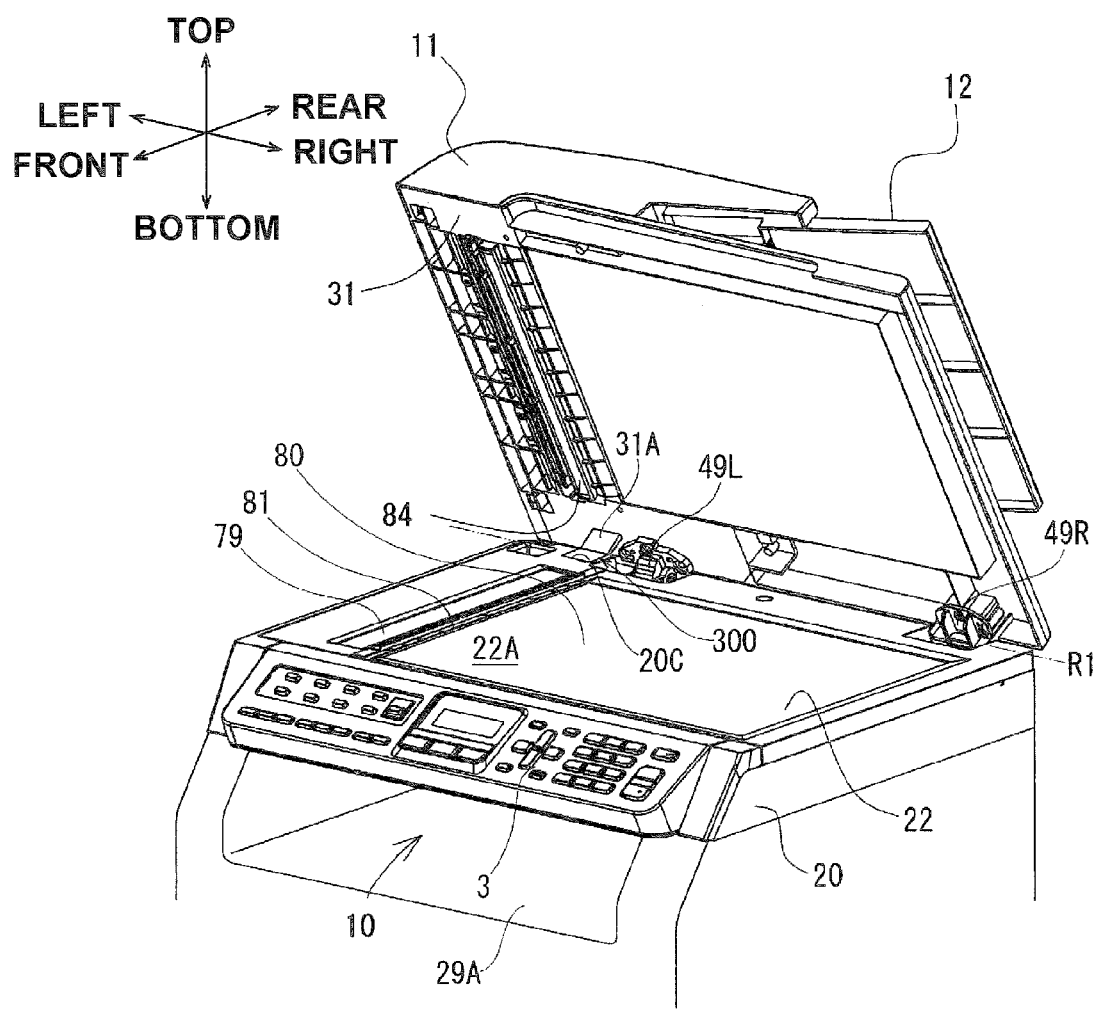
FIG. 5 is a perspective view of the multifunction apparatus of FIG. 1 with the ADF in an open state.
Figure 8:
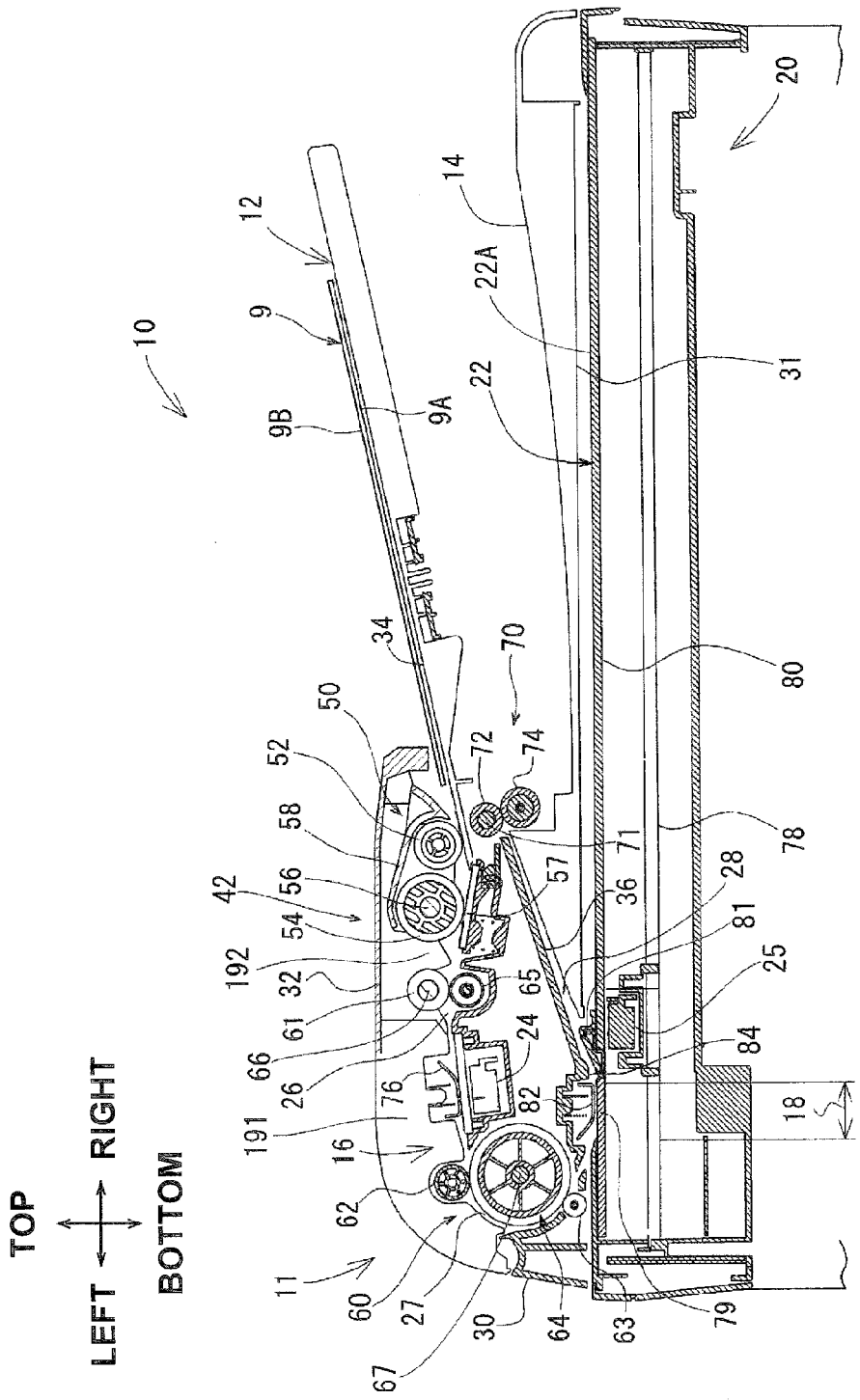
FIG. 8 is a cross sectional view of the multifunction apparatus taken along the line B-B of FIG. 4.

As shown in FIGS. 5 and 8, the top side of the main unit 20 includes a contact glass 22. The contact glass 22 includes a first glass 79 on the left, and a second glass 80 on the right. The first glass 79 is used when an image is read by a main unit-side reading portion 25 at a fixed position. The second glass 80 is used when an image is read by the main unit-side reading portion 25 which moves. A document separation member 81 is interposed between the first glass 79 and the second glass 80. The second glass 80 includes a surface facing upward, where the upward facing surface functions as a document receiving surface 22A on which a document (in the form of a sheet or book) to be read is received or placed.

As shown in FIGS. 7 and 8, an interior of the main unit 20 includes a main unit-side reading portion 25, which is disposed under the contact glass 22. In one example, the main unit-side reading portion 25 may include an image reading sensor, such as a contact image sensor (CIS) and a charge coupled device (CCD). In this example embodiment, a CIS is used. In FIG. 8, the interior of the main unit 20 includes a slide shaft 78 which extends in a left-right direction and is fixed to inner side surfaces of a casing of the main unit 20. The main unit-side reading portion 25 is slidably supported by the slide shaft 78. During standby, the main unit-side reading portion 25 is located under the left end of the second glass 80. The main unit-side reading portion 25 is configured to slide in the left-right direction (which is a sub scanning direction of the main unit-side reading portion 25) along the slide shaft 78. In one example, the main unit-side reading portion 25 is driven by a pulley belt mechanism (not shown) based on control signals from the control circuit board 201.

As shown in FIG. 3, in a standby state, the main unit-side reading portion 25 is located closer to the upper portion of the control circuit board 201. When viewed from above, the main scanning direction (extending in the front-rear direction, perpendicular to the drawing sheet of FIG. 3) of the main unit-side reading portion 25 is shifted from the main scanning direction of the reading portion 24. In a particular example, the main unit-side reading portion 25 is disposed closer to the hinge member 49L rather than the reading portion 24, and the reading portion 24 is shifted to the left and spaced a specified distance apart from the main unit-side reading portion 25. As will be described later, this arrangement facilitates routing layout of a main unit-side flexible flat cable 7B such that it extends downward along and on the right side of the flexible flat cable 7A. As a result, an overlap section between L1 and L2, which will be described in further detail below, can be shortened.

When the user puts a document or a book open on the second glass 80 (e.g., FIGS. 5 and 8) to read an image formed on a surface of the document or the book facing the second glass 80 (FIGS. 5 and 8) (e.g., when automatic document reading operation of the ADF 11 is not used) the main unit-side reading portion 25 moves from the left end to the right end under the second glass 80 (FIGS. 5 and 8) to read the image formed on the surface of the document or the book. The output signals (including image data) of the main unit-side reading portion 25 are transmitted to the control circuit board 201 via the main unit-side flexible flat cable 7B, which electrically connects the main unit-side reading portion 25 and the control circuit board 201 in the main unit 20, as shown in FIG. 7. Based on the output signals of the main unit-side reading portion 25, the control circuit board 201 creates print data for the image of the document or controls the image forming unit 29 to perform controls for forming an image on a recording medium.

The ADF 11 will be described in further detail.

As shown in FIG. 8, the ADF 11 includes a document tray 12 and an output tray 14, which are arranged vertically in this example embodiment. The document tray 12 is configured to receive a stack of sheets, as documents, to be read. The output tray 14 is configured to receive ejected sheets.

The ADF 11 further includes a feeder 42 and the reading portion 24. The feeder 42 is configured to pick up a single sheet 9 or other type of recording medium from sheets placed on the document tray 12 and automatically feed the sheet along a feed path 16 to the output tray 14. The reading portion 24 is configured to read an image formed on a first surface 9A of the sheet 9 in a middle of the feed path 16. It is noted that the first surface 9A faces down when the sheet 9 is placed on the document tray 12, and an opposite side to the first surface 9A is referred to as a second surface 9B.

The feeder 42 will be described in further detail with continued reference to FIG. 8.

In the feeder 42, the feed path 16 is defined by a first feed path 26, a curved feed path 27, and a second feed path 28. The first feed path 26 extends from the document tray 12 to the left. The curved feed path 27 connects to the first feed path 26 and is curved in an arc from the first feed path 26 downward. The second feed path 28 connects to the curved feed path 27 and extends from the curved feed path 27 to the upper right toward the output tray 14.

The feeder 42 includes a feeder body frame 30, an upper guide 34, a lower guide 36, and an upper cover 32. The feeder body frame 30, the upper guide 34, and the lower guide 36 make up a base member. The upper cover 32 covers a left part of the upper guide 34. The feeder body frame 30 is box-shaped and constitutes a bottom surface and side surfaces of the ADF 11. The upper guide 34 defines a part of the first feed path 26 and is shaped like a plate which extends from the document tray 12 to a location close or proximate to a supply unit 50. The lower guide 36 defines a part of the second feed path 28 and is shaped like a plate extending from below a main roller 64 to a location close to an ejection unit 70.

The left end of the upper cover 32 is pivotally supported by the left end of the feeder body frame 30. Although not shown, when the right end of the upper cover 32 is raised, the top of the first feed path 26 is exposed such that cleaning around the reading portion 24 and clearing of paper jamming can be performed.

The upper cover 32 includes inside reinforcing ribs 191, 192. With the upper cover 32 closed, the reinforcing ribs 191, 192 protrude downward and extend from the right end of the upper cover 32 to the left end thereof. The reinforcing ribs 191, 192 of the upper cover 32 are configured to guide an upper surface of the sheet fed from the document tray 12 and constitute a part of the first feed path 26 and the curved feed path 27.

The main roller 64 is disposed at the left end of the feeder body frame 30 and under the left end of the reinforcing rib 191. The inner wall surface of the feeder body frame 30 at the left end, the left ends of the reinforcing ribs 191, 192, and an outer peripheral surface of the main roller 64 are configured to guide a sheet fed through the first feed path 26 toward a downstream side in a sheet feeding direction. In other words, the inner wall surface of the feeder body frame 30 at the left end, the left ends of the reinforcing ribs 191, 192, and the outer peripheral surface of the main roller 64 constitute at least a portion of the curved feed path 27.

A lower portion of the inner wall surface of the feeder body frame 30 and the lower guide 36 are configured to guide a sheet fed through the curved feed path 27 toward the output tray 14. In other words, the inner wall surface of the feeder body frame 30 at the lower side and the lower guide 36 constitute at least a portion of the second feed path 28. As shown in FIGS. 5 and 8, a lower surface 31 of the feeder body frame 30 of the ADF 11 includes an opening 84. The opening 84 is located in a boundary between the curved feed path 27 and the second feed path 28. When the sheet passes the opening 84, the sheet fed through the second feed path 28 is exposed to the main unit 20 at the opening 84.

The sheet fed from the curved feed path 27 toward the second feed path 28 passes through the opening 84 over the first glass 79 disposed in the main unit 20. At this time, the document separation member 81, which is disposed between the first glass 79 and the second glass 80, separates the sheet from the first glass 79 and reliably guides the sheet toward the second feed path 28.

As shown in FIG. 8, the feeder 42 includes the supply unit 50, a feeding unit 60, and an ejection unit 70.

The supply unit 50 is disposed downstream from the document tray 12 in the sheet feeding direction, and is configured to pick up a sheet from the sheets 9 placed on the document tray 12 and supply the sheet toward a downstream side. The supply unit 50 includes a pickup roller 52 disposed above the upper guide 34, a separation roller 54, and a separation pad 57.

The separation roller 54 is disposed substantially in the middle of a first rotation shaft 56 which is rotatably supported at its front and rear ends by the feeder body frame 30. The first rotation shaft 56 is driven by a drive source 99 (shown in FIGS. 2, 3, 4, and 7) comprised of an electric motor and gears, and rotates in a predetermined direction (e.g., clockwise in FIG. 8). Accordingly, the separation roller 54 rotates along with the first rotation shaft 56.

The first rotation shaft 56 pivotally supports a holder 58. The holder 58 encloses the separation roller 54 and extends toward the document tray 12. The holder 58 rotatably supports the pickup roller 52 in the extending portion. The pickup roller 52 is coupled to the first rotation shaft 56 via gears (not shown) disposed in the holder 58. Thus, when the first rotation shaft 56 rotates, not only does the separation roller 54 rotate, the pickup roller 52 also rotates (e.g., in a clockwise direction). Accordingly, the holder 58 is configured to pivot so as to press the pickup roller 52 down toward the upper guide 34.

According to this embodiment, the separation roller 54 faces the separation pad 57. The separation pad 57 is pressed against the separation roller 54 from below. The separation pad 57 is typically formed of a suberic material and is configured to slidably contact a first surface 9A of a sheet or other recording medium passing on the separation pad 57 and to exert a great or significant frictional force against the sheet.

The pickup roller 52 is configured to rotate while in contact with a second surface 9B of the sheet (or other recording medium) placed on the document tray 12 to apply a force to the sheet (or other recording medium). The separation roller 54 is also configured to rotate while in contact with the second surface 9B of the sheet fed by the pick up roller 52 to also apply a force to the sheet or other recording medium. In some configurations, when a few sheets are passing between the separation roller 54 and the separation pad 57, only the uppermost sheet in contact with the separation roller 54, is separated from the sheets due to the frictional force of the separation pad 57, and fed to a downstream side in the sheet feeding direction. The sheet is fed between the pickup roller 52 and the upper guide 34 and between the separation roller 54 and the separation pad 57, the supply unit 50 constitutes the first feed path 26 along with the upper guide 34 and the reinforcing ribs 191, 192 of the upper cover 32.

The feeding unit 60 is configured to feed the sheet picked up from the document tray 12 by the supply unit 50 along the curved feed path 27 and the second feed path 28. The feeding unit 60 includes a feed roller 61 and a pinch roller 65. The feed roller 61 is disposed on the left of the separation roller 54 (on a downstream side in the sheet feeding direction from the separation roller 54 in the middle of the first feed path 26). The pinch roller 65 is disposed facing the feed roller 61. The feeding unit 60 further includes the main roller 64, which is disposed in the curved feed path 27, and pinch rollers 62, 63, which are disposed facing the main roller 64.

The feed roller 61 is disposed substantially in the middle of a second rotation shaft 66 which is rotatably supported at its front and rear ends by the feeder body frame 30. The second rotation shaft 66 is driven by the drive source 99 and rotates in a predetermined direction (e.g., clockwise in FIG. 8), as with the first rotation shaft 56. Accordingly, the feed roller 61 rotates along with the second rotation shaft 66.

The sheet fed by the separation roller 54 is nipped by the feed roller 61 and the pinch roller 65. The feed roller 61 is configured to rotate while in contact with the second surface 9B of the sheet to apply a force to the sheet. The feed roller 61 and the pinch roller 65 also constitute the first feed path 26.

The main roller 64 is disposed around a third rotation shaft 67 which is rotatably supported at its front and rear ends by the feeder main frame 30. The third rotation shaft 67 is driven by the drive source 99 and rotates in a predetermined direction (e.g., clockwise in FIG. 8) as with the first and second rotation shafts 56, 66. Accordingly, the main roller 64 rotates along with the third rotation shaft 67.

When the sheet fed by the feed roller 61 passes over the reading portion 24, the sheet is nipped by the main roller 64 and the pinch roller 62, and is subsequently nipped by the main roller 64 and the pinch roller 63 on the downstream side in the sheet feeding direction. The main roller 64 rotates while in contact with the first surface 9A of the sheet, thereby applying a force to the sheet, and feeds the sheet toward the downstream side of the second feed path 28. The main roller 64 and the pinch rollers 62, 63 constitute the curved feed path 27 along with the left inner wall surface of the feeder main frame 30 and the left ends of the reinforcing ribs 191, 192 of the upper cover 32.

The ejection unit 70 is configured to eject the sheet, which is fed through the second feed path 28 by the feeding unit 60, to the output tray 14. The ejection tray 70 includes an ejection roller 72 and a pinch roller 74, which are disposed on the right end of the lower guide 36 (on the downstream side of the second feed path 28). The ejection roller 72 is disposed around a fourth rotation shaft 71 which is rotatably supported at its front and rear ends by the feeder main frame 30. The fourth rotation shaft 71 is driven by the drive source 99 and rotates in a predetermined direction (e.g., counterclockwise in FIG. 8), as with the first, second and third rotation shafts 56, 66, 67. Accordingly, the ejection roller 72 rotates along with the fourth rotation shaft 71. In operation, the sheet fed along the second feed path 28 is nipped by the ejection roller 72 and the pinch roller 74, and ejected to the output tray 14. The ejection roller 72 and the pinch roller 74 constitute the second feed path 28 along with the inner bottom surface of the feeder main frame 30 and the lower guide 36.

As with the main unit-side reading portion 25, the reading portion 24 may use a contact image sensor (CIS). The reading portion 24 is disposed on the downstream side from the feed roller 61 in the sheet feeding direction such that its reading surface faces the first feed path 26. In the first feed path 26, the reading portion 24 is disposed downstream from the feed roller 62 and upstream from the main roller 64, and the first surface 9A of the sheet fed in the first feed path 26 passes over the top surface of the reading portion 24. The main scanning direction of the reading portion 24 is generally parallel to the left side surface 20B of the main unit 20 and the reading portion 24 is disposed closer to the left side surface 20B than the right side in the left-right direction.

According to another aspect, a white member 76 is disposed above the reading portion 24. The white member 76 is elastically urged by a coil spring toward the reading portion 24. While being pressed toward the reading portion 24 by the white member 76, the sheet fed from the feed roller 61 passes the top surface of the reading portion 24. The white member 76 and the top surface of the reading portion 24 (e.g., a glass member covering the top of the image sensor) also constitute the first feed path 26. The output signals (including image data) of the reading portion 24 are transmitted to the control circuit board 201 via the flexible flat cable 7A disposed between the ADF 11 and the main unit 20, as shown in FIG. 7. The control circuit board 201 creates print data to print an image on the first surface 9A of the sheet based on the output signals of the reading portion 24, or controls the image forming unit 29, and performs various controls for forming an image on a recording medium.

When the ADF 11 is used and operates, the main unit-side reading portion 25 moves to an image reading position 18 (FIG. 8) and stops there. In this state, the top surface of the main unit-side reading portion 25 faces the second feed path 28 via the opening 84. The sheet fed by the feeding unit 60, at some point, will reach the image reading position 18 on the first glass 79. At this point in time, the second surface 9B of the sheet passes over the top surface of the main unit-side reading portion 25. The sheet is separated from the first glass 79 by the document separation member 81.

The white member 82 is located opposite to the main unit-side reading portion 25 when the main unit-side reading portion 25 is standing by in the image reading position 18 via the first glass 79. The white member 82 is elastically urged by the coil spring toward the main unit-side reading portion 25 standing by in the image reading position 18. The sheet fed along the second feed path 28 passes over the top surface of the main unit-side reading portion 25 while being pressed toward the main unit-side reading portion 25 by the white member 82. The main unit-side reading portion 25 reads the image formed on the second surface 9B of the sheet. The output signals of the main unit-side reading portion 25 are transmitted to the control circuit board 201 via the main unit-side flexible flat cable 7B. The control circuit board 201 performs various controls described above. The first glass 79 and the white member 82 constitute the second feed path 28 through which the sheet passes.

Automatic document reading operation of the ADF 11 will be described in further detail.

As shown in FIG. 8, the user places one or more sheets 9 (or other recording media) on the document tray 12 such that leading ends of the sheets 9 are inserted into the supply unit 50. When the user operates the operation panel 3 to start automatic document reading by the ADF 11, the control circuit board 201 controls the feeder 42 and the reading portion 24 in the ADF 11 to begin an automatic document reading operation. The sheets 9 placed on the document tray 12 are individually (e.g., a single sheet at a time) picked up and fed along the feed path 16. In the first feed path 26, an image formed on the first surface 9A is read by the reading portion 24. The sheet is further fed along the feed path 16, and when the sheet passes the curved feed path 27, it is inverted. The second surface 9B of the sheet faces downward in the second feed path 28. An image formed on the second surface 9B is read by the main unit-side reading portion 25, and the sheet is ejected to the output tray 14. This operation is automatically repeated until the sheets on the document tray 12 have been read and no sheets remain on the document tray 12.

As shown in FIGS. 2, 3, and 7, the multifunction apparatus 10 includes the flexible flat cable 7A and the main unit-side flexible flat cable 7B. The flexible flat cable 7A is configured to electrically connect the reading portion 24 of the ADF 11 and the control circuit board 201 of the main unit 20 and to transmit the output signals of the reading portion 24 to the control circuit board 201. The main unit-side flexible flat cable 7B is configured to electrically connect the main unit-side reading portion 25 and the control circuit board 201 in the main unit 20 and to transmit the output signals of the main unit-side reading portion 25 to the control circuit board 201.

According to one or more arrangements, the flexible flat cable 7A and the main unit-side flexible flat cable 7B are cables with multi thin covered conductors united into a strip. Generally, flexible flat cables are susceptible to damage such as breaks due to excessive twisting and repeated bending or pulling, and are sensitive to static electricity and electromagnetic wave noise (which, for example, may leak from the power supply portion 202 and/or the drive source 99). Thus, in this example embodiment, a routing layout as further described below is used for the flexible flat cable 7A and the main unit-side flexible flat cable 7B to prevent and minimize such damage and interference/sensitivity.

Figure 9:
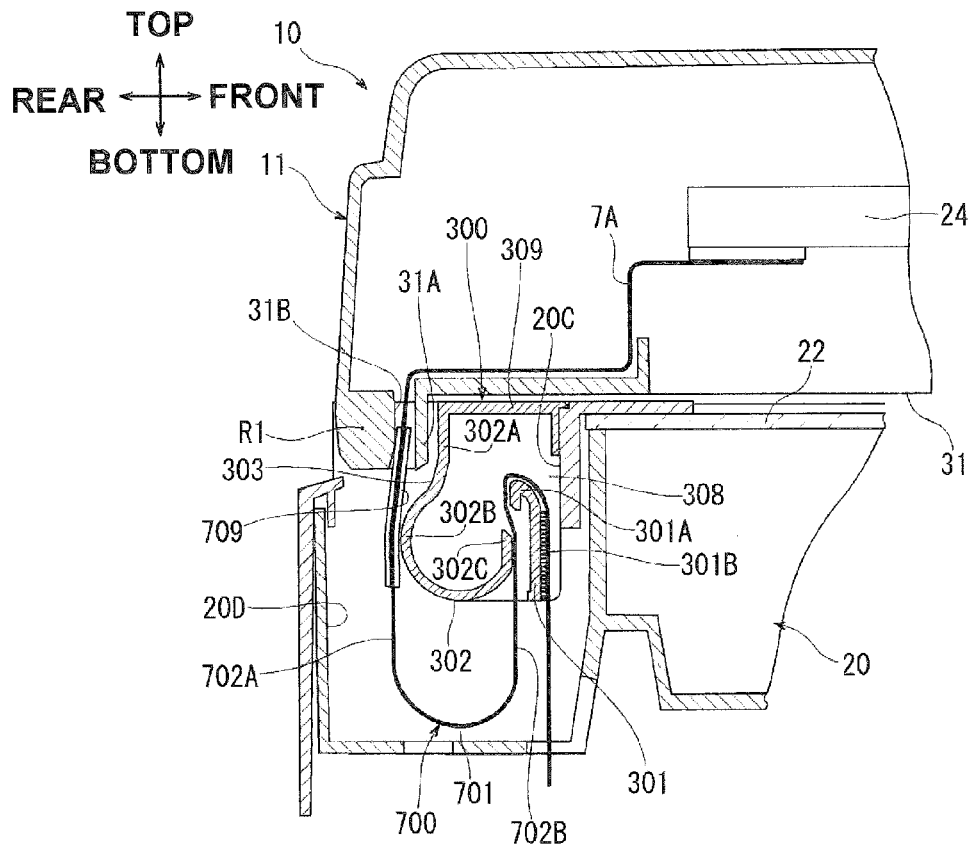
FIG. 9 is a cross sectional view of the multifunction apparatus, in which the ADF is in a closed state, taken along the line C-C of FIG. 4.

As shown in FIGS. 2 and 9 (cross sectional view taken along the line C-C of FIG. 4), the upper end of the flexible flat cable 7A is connected to an end on the rear side of the reading portion 24 whose main scanning direction is the front-rear direction. As shown in FIG. 9, the flexible flat cable 7A extends from the end on the rear side of the reading portion 24 toward the bottom surface of the ADF 11, and extends along a bottom portion of the feeder main frame 30 of the ADF 11 toward the rear side of the ADF 11. The flexible flat cable 7A further extends downward through a cable insertion hole 31B formed in the bottom portion on the rear side of the feeder main frame 30 toward an opening 20C formed in the top surface on the rear side of the main unit 20. In some examples, the cable insertion hole 31B may be long and thin in the left-right direction and formed slightly longer than a width of the flexible flat cable 7A. Additionally or alternatively, the cable insertion hole 31B may be formed longer than a thickness of the flexible flat cable 7A in the front-rear direction. Thus, the flexible flat cable 7A is smoothly movable in the cable insertion hole 31B and is prevented from being twisted. The lower end on the rear side of the ADF 11 integrally includes a cover portion 31A. The cover portion 31A is disposed in front of the cable insertion hole 31B, is shaped like a plate, and protrudes downward.

Figure 12:
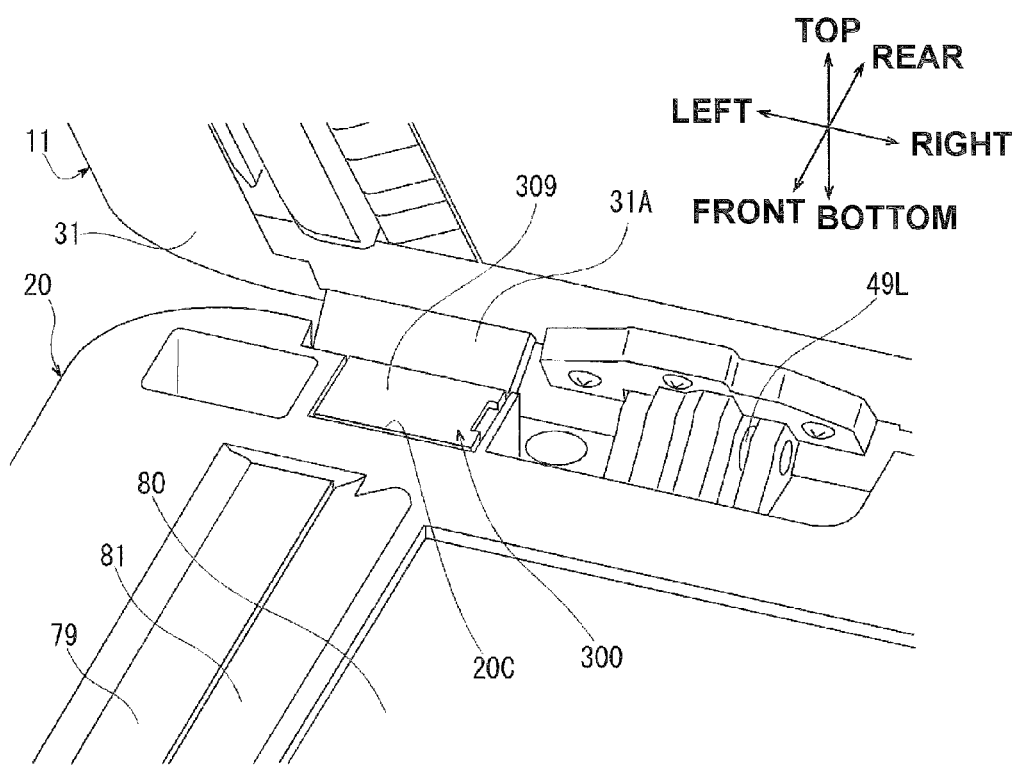
FIG. 12 is an enlarged perspective view of the multifunction apparatus illustrating the guide unit and a cover portion when the ADF is open.

As shown in FIG. 12, the opening 20C is rectangularly shaped, located to the left of the hinge member 49L, and positioned slightly to the right of the center of the first glass 79. As shown in FIG. 9, the opening 20C has a depth (internal space) downward in which a guide unit 300 is inserted. The internal space is defined in the frame constituting the main unit 20. Even with the guide unit 300 inserted, the internal space has a further space extending rearward and downward, which is referred to as a cable storing portion 20D.

Figure 10:
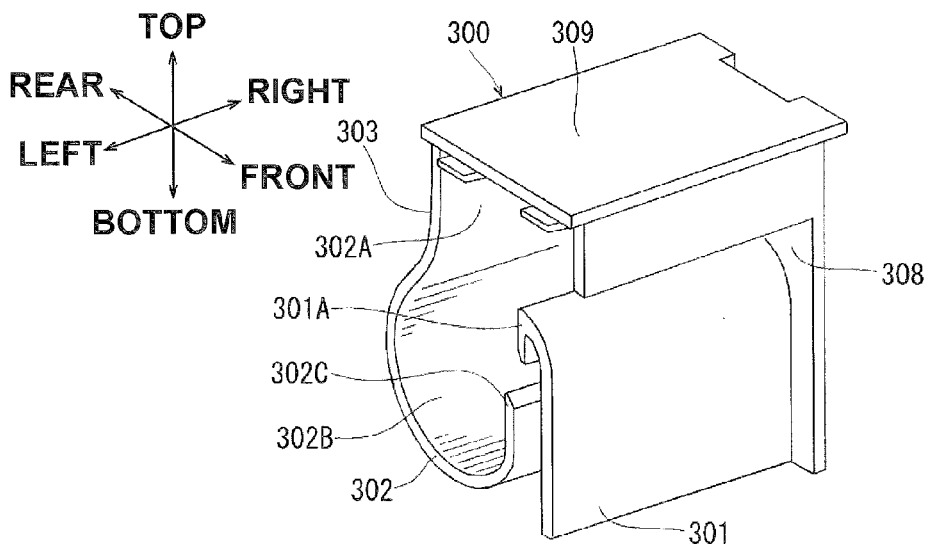
FIG. 10 is a perspective view of an example guide unit of a multifunction apparatus.

As shown in FIGS. 9 and 10, the guide unit 300 includes a lid portion 309, a side wall portion 308 extending downward from the right end of the lid portion 309, and a rib 301 protruding leftward from the front end of the side wall portion 308. As shown in FIG. 12, with the guide unit 300 inserted in the opening 20C, the lid portion 309 is flush with the top surface of the main unit 20. The rib 301 is generally shaped like a flat plate which is vertical relative to the lid portion 309. The rib 301 has an upper end 301A, which is vertically spaced apart from the lid portion 309 and is bent downward (e.g., resulting in a hook-like shape).

The guide unit 300 includes a space holding portion 302, which is attached to and extends from the rear end of the side wall portion 308 and protrudes leftward. The space holding portion 302 is spaced apart from and facing the rib 301 in the front-rear direction. The upper end of the space holding portion 302 is connected to the rear end of the lid portion 309. The space holding portion 302 includes a generally flat portion 302A and a generally cylindrical portion 302B. The generally flat portion 302A is generally shaped like a flat plate, which is vertical relative to the lid portion 309, and extends downward from the lid portion 309. The generally cylindrical portion 302B is connected to the generally flat portion 302A and has a cylindrical shape or C-shape. The generally cylindrical portion 302B is not closed in a circumferential direction, and an end 302C of the generally cylindrical portion 302B is vertically spaced apart from and facing the upper end 301A of the rib 301. The generally cylindrical portion 302B protrudes further rearward than the generally flat portion 302A. This protruding portion makes an escape portion 303 above the generally cylindrical portion 302B and at the rear of the generally flat portion 302A. In the guide unit 300, a side surface opposite to the side wall portion 308 via the rib 301 and the space holding portion 302 is exposed.

As shown in FIG. 9, the flexible flat cable 7A, which hangs down through the cable insertion hole 31B toward the opening 20C, passes through the escape portion 303, is routed along the rear surface of the space holding portion 302, extends vertically, and is curved upward in the vicinity of the bottom portion of the cable storing portion 20D. In the escape portion 303, the cover portion 31A is located between the flexible flat cable 7A and the rear surface of the space holding portion 302.

The flexible flat cable 7A is further routed along the front surface of the space holding portion 302, extends generally vertically upward, and passes between the termination 302C of the space holding portion 302 and the upper end 301A of the rib 301. Then, the flexible flat cable 7A changes its course downward along the shape of the upper end 301A (e.g., following and/or adhering to the curvature and shape of upper end 301A). The flexible flat cable 7A is routed along the front surface of the rib 301, and extends further downward generally vertically. In one particular example, the flexible flat cable 7A may be fixed to the front surface of the rib 301 with a double-faced tape 301B. Other types of adhesives or adhesive materials, mechanical or electromagnetic securing mechanisms and the like may also be used.

As shown in FIG. 9, the rib 301 fixes a predetermined portion of the flexible flat cable 7A and holds the flexible flat cable 7A to allow slack therein between the fixed portion and the cable insertion hole 31B in a U-shape when viewed along the left-right direction (the rotation axis R1). Accordingly, a generally U-shaped slack portion 700 can be secured. The space holding portion 302 supports the generally U-shaped slack portion 700 by maintaining generally straight portions 702A, 702B, a predetermined distance apart. The predetermined distance is set so as to maintain that the curvature of the curved portion 701 equals or exceeds a curvature that prevents or minimizes damage such as breaks even if the flexible flat cable 7A is repeatedly bent. An antistatic member 709 (for example, a known antistatic tape) covers a portion of the flexible flat cable 7A that is on a side closer to the generally straight portion 702A than the generally straight portion 702B and may be exposed outside by vertical movement of the ADF 11.

Figure 11:
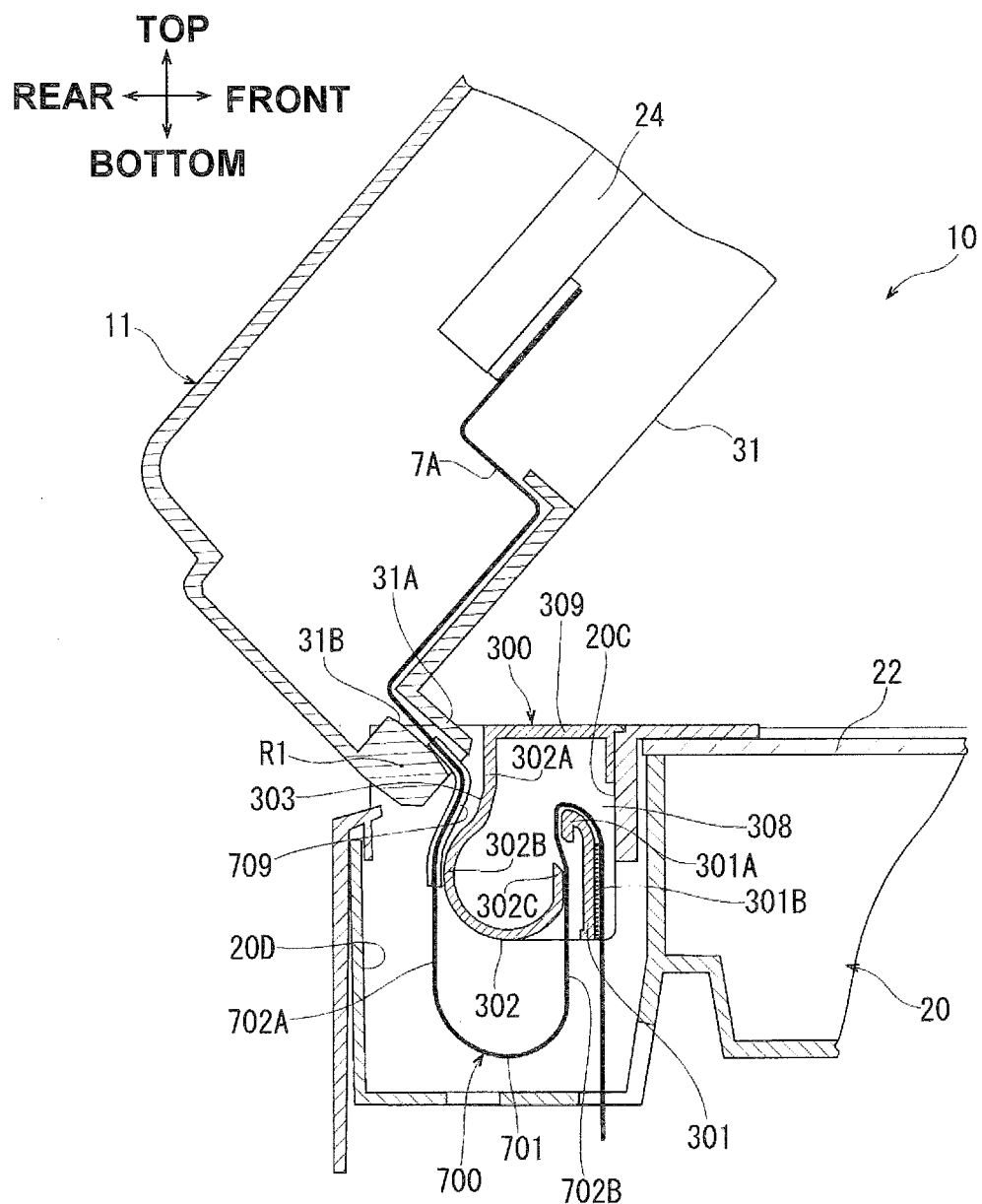
FIG. 11 is a cross sectional view of the multifunction apparatus, in which the ADF is in an open state, taken along the line C-C of FIG. 4.

As shown in FIG. 11, when the ADF 11 pivots around the rotation axis R1 and is positioned in the open state with respect to the main unit 20, the guide unit 300 raises the generally straight portion 702A, which is closer to the ADF 11 than the generally straight portion 702B, while maintaining the shape of the curved portion 701 of the flexible flat cable 7A at the space holding portion 302. At this time, as the generally straight portion 702A is moved upward (due to the movement of the ADF 11), the curved portion 701 is also pulled upward. However, the curvature of the curved portion 701 can be maintained such that the curvature is greater than or equal to the specified curvature because the space holding portion 302 maintains the distance between the opposed generally straight portions 702A and 702B. When the ADF 11 pivots around the rotation axis R1, the lower end of the ADF 11 on the rear side, the flexible flat cable 7A and the cover portion 31A move frontward. However, as the guide unit 300 includes the escape portion 303, the lower end of the ADF 11 on the rear side, the flexible flat cable 7A and the cover portion 31A can enter the escape portion 303. In other words, the formation of the escape portion 303 can provide for a space that the lower end of the ADF 11 on the rear side, the flexible flat cable 7A and the cover portion 31A can enter, without having to increase the size of the apparatus in the front-rear direction, and reliably reduce the possibility of the flexible flat cable 7A being caught between the lower end of the ADF 11 and the cover portion 31A.

As shown in FIG. 12, when the ADF 11 is in the open state, the cover portion 31A covers the flexible flat cable 7A from the front side. Thus, exposure of the flexible flat cable 7A to the front side of the main unit 20 can be eliminated and the flexible flat cable 7A can be reliably protected.

Figure 13:
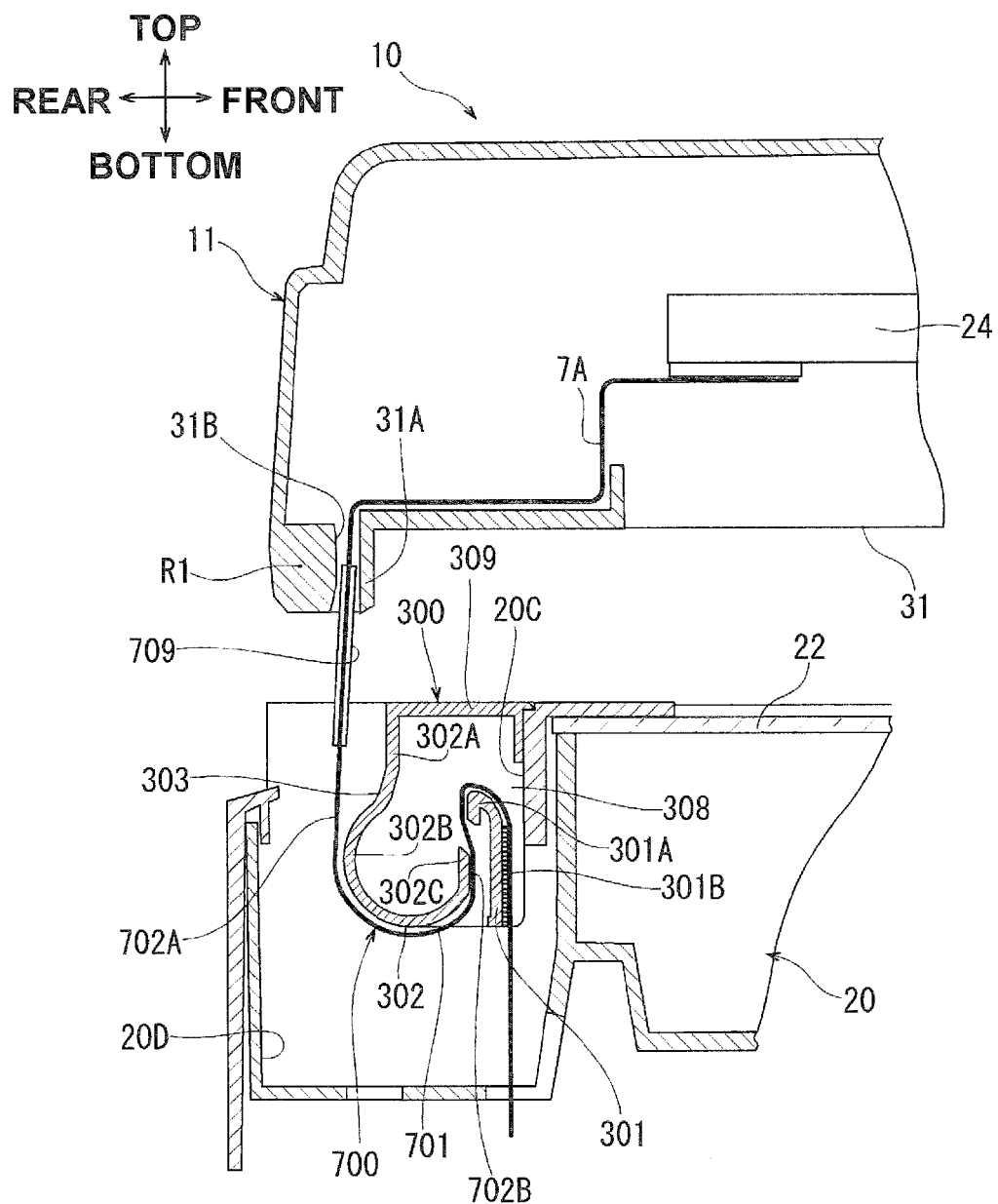
FIG. 13 is a cross sectional view of the multifunction apparatus taken along the line C-C of FIG. 4, in which the ADF is spaced upwardly apart from the multifunction apparatus.

As shown in FIG. 13, when the ADF 11 moves up with respect to the main unit 20, the generally straight portion 702A, which is on the side close to the ADF 11, and the curved portion 701 of the flexible flat cable 7A are moved upward. When the generally straight portion 702A moves up, the curved portion 701 is pulled upward as a result. However, as the curved portion 701 moves along the cylindrical portion 302B of the space holding portion 302, the curvature of the curved portion 701 can be maintained so as to be greater than or equal to the predetermined curvature. Even when the generally straight portion 702A, which is on a side close to the ADF 11, moves up and its surface is exposed outside, the surface is covered by the antistatic member 709. Without hindering the movement of the flexible flat cable 7A, the antistatic member 709 protects the flexible flat cable 7A from electrostatic discharge and contact.

The guide unit 300 is configured to guide the flexible flat cable 7A such that the flexible flat cable 7A can follow the pivotal or vertical movement of the ADF 11. As the space holding portion 302 can prevent the curvature of the curved portion 701 from becoming too small, the flexible flat cable 7A can be prevented from damage caused by being excessively bent. Furthermore, since the flexible flat cable 7A is fixed at the predetermined portion to the front surface of the rib 301 with the double-faced tape 301B (or other adhesive or fixing mechanism), the flexible flat cable 7A is not displaced with respect to the guide unit 300. When the ADF 11 pivots or moves up or down with respect to the main unit 20, the space holding portion 302 can guide the flexible flat cable 7A reliably.

Figure 14:
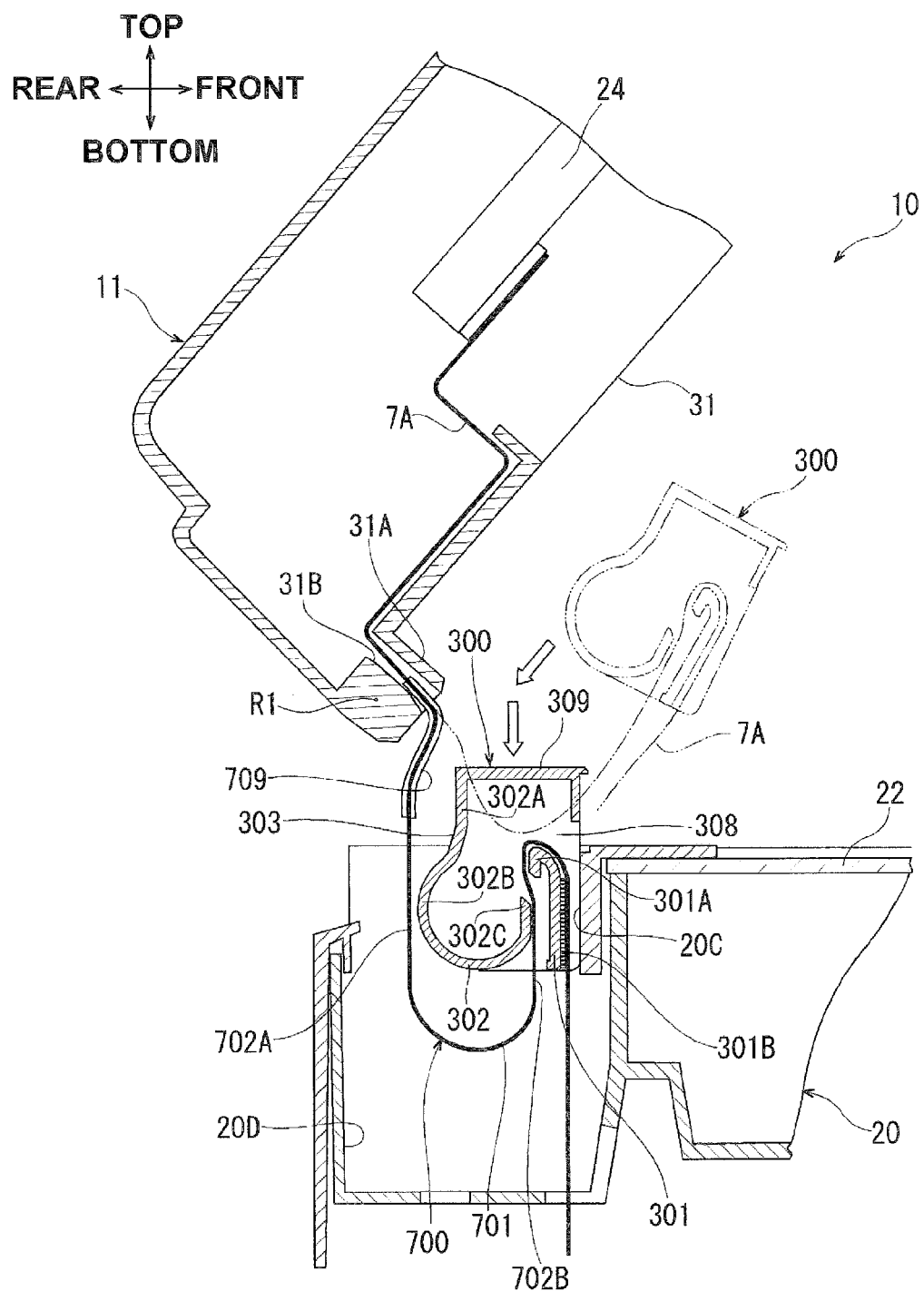
FIG. 14 is a cross sectional view of the multifunction apparatus with an example guide unit being inserted in an opening of the multifunction apparatus according to one or more aspects described herein.

The guide unit 300 is provided separately from the main unit 20. For example, guide unit 300 may be non-destructively detachable from and attachable to main unit 20. As shown by a chain double-dashed line in FIG. 14, the flexible flat cable 7A is previously fixed to the rib 301 of the guide unit 300 with the double-faced tape 301B, and then the guide unit 300 is combined with the ADF 11. When the guide unit 300 is viewed from the rotation axis R1, the side surface opposite to the side wall portion 308 via the rib 301 and the space holding portion 302 is released. The flexible flat cable 7A can be easily inserted into the guide unit 300 from the released side surface. Thus, the flexible flat cable 7A can be easily routed along the space holding portion 302 and the rib 301 and fixed to the front surface of the rib 301 with the double-faced tape 301B. When the ADF 11 is attached to the main unit 20, the columnar portions of the hinge members 49R, 49L (only 49L shown in FIG. 6) are inserted into the guide holes 20A, the lower end side of the flexible flat cable 7A is inserted into the opening 20C and the cable storing portion 20D, and then guide unit 300 is inserted into the opening 20C from the released side (front side) of the ADF 11 and mounted therein. In this manner, the guide unit 300 can be easily fitted into the opening 20C, which achieves simplification of the assembly operation. The flexible flat cable 7A can be easily replaced with a new cable by, for example, removing the guide unit 300 from the opening 20C.

The following will describe the routing layout of the flexible flat cable 7A which extends below the point at which the flexible flat cable 7A is fixed to the rib 301.

Figure 15:
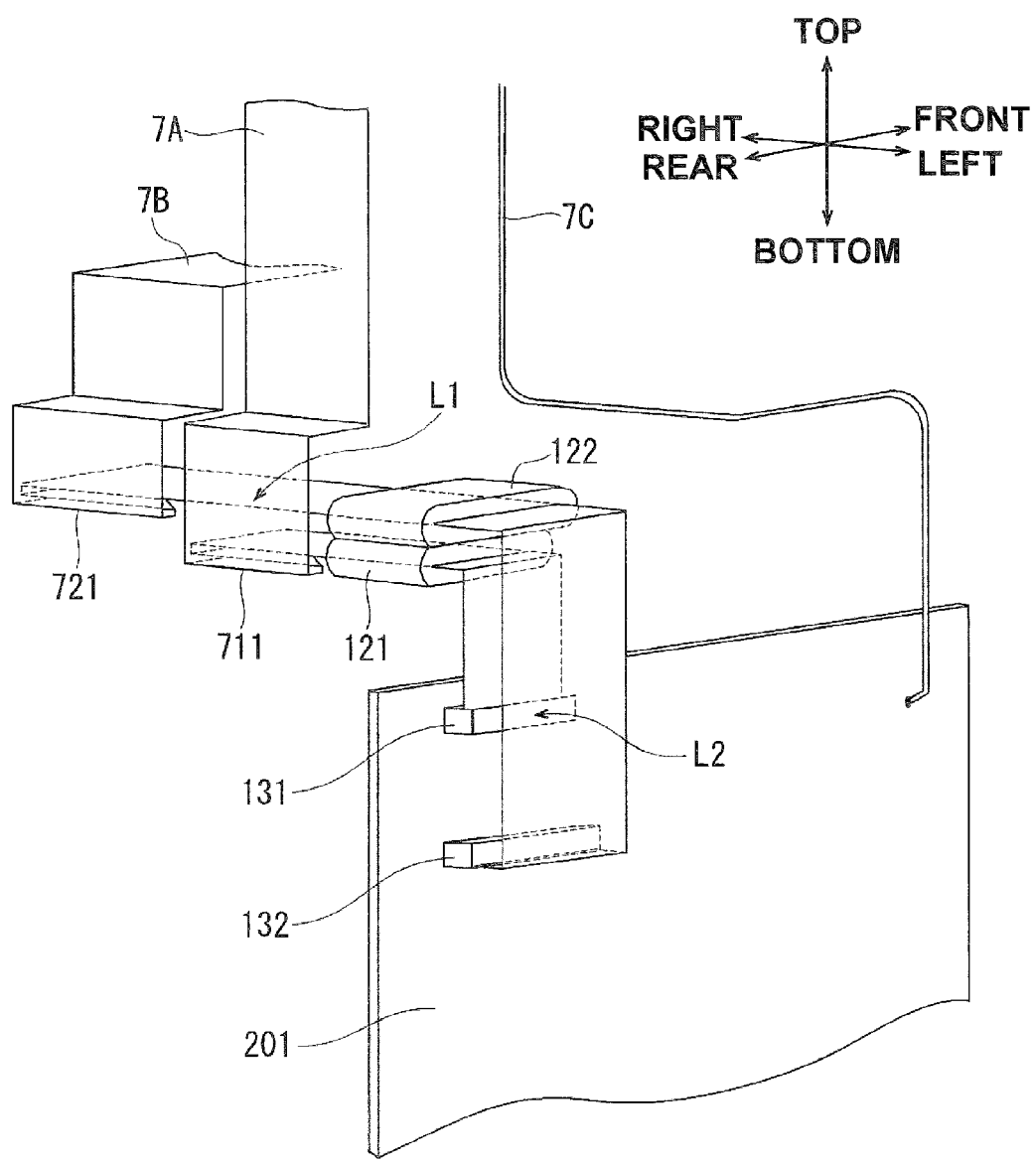
FIG. 15 is a perspective view of an example routing layout of the flexible flat cable, a main unit-side flexible flat cable and a wiring cable in the multifunction apparatus.
Figure 16:
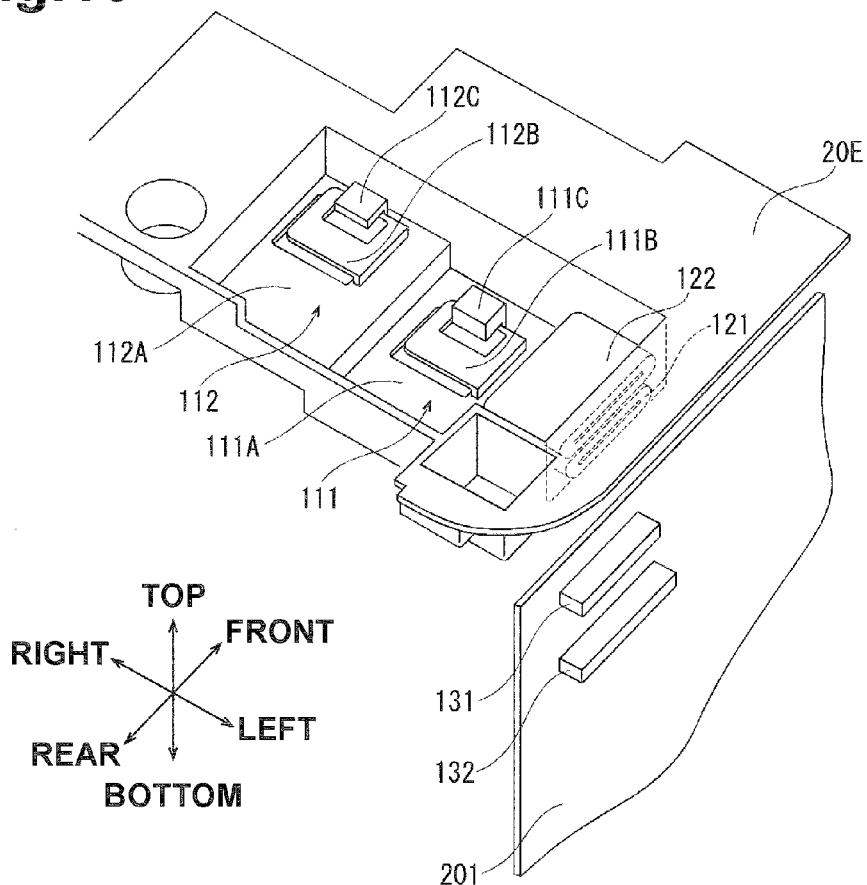
FIG. 16 is a perspective view of an example contact prevention mechanism of the multifunction apparatus.

As shown in FIG. 15, the flexible flat cable 7A runs along the front surface of the rib 301, extends downward in a generally straight fashion, changes its course rearward, then changes its direction downward before reaching the top of a frame member 20E (FIG. 16) disposed inside the main unit 20. As shown in FIG. 16, the frame member 20E is dish-shaped and extends horizontally. A left end of frame member 20E is positioned above the upper end of the control circuit board 201. A first holding member 111 is formed in the middle of the frame member 20E, and a second holding member 112 is formed on the right side of the first holding member 111. A first ferrite core 121 is disposed on the left side of the first holding member 111, and a second ferrite core 122 is disposed on top of the first ferrite core 121 in layers.

The first and second holding members 111 and 112 and the first and second ferrite cores 121 and 122 may form and constitute a contact prevention mechanism. In one or more arrangements, the first holding member 111 may have a first height different from a second height of the second holding member 112. In another arrangement, the first holding member 111 may be disposed in a vertically higher position than the second holding member 112.

In FIG. 15, the frame member 20E is omitted for the sake of clarity in illustrating and describing the routing layout of the flexible flat cable 7A. In FIG. 15, it is assumed that the first holding member 111 provided in the frame member 20E as shown in FIG. 16 is located directly under a portion 711 where the flexible flat cable 7A changes its course frontward.

Figure 17:
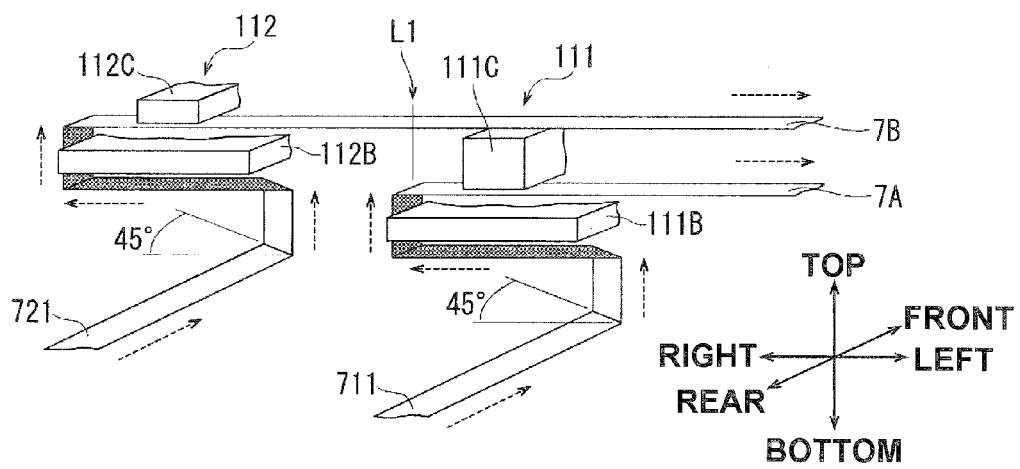
FIG. 17 is an example diagrammatic sketch of the contact prevention mechanism.

As shown in FIG. 16, the first holding member 111 includes a first step portion 111A, a first flat portion 111B, and a first pressing portion 111C. The first step portion 111A is recessed downward with respect to the top surface of the frame member 20E. The first flat portion 111B is disposed above the first step portion 111A. The first pressing portion 111C is disposed above the first flat portion 111B. As shown in FIG. 17, the flexible flat cable 7A extends over the first step portion 111A toward the front from the portion 711 where the flexible flat cable 7A changes its course frontward, then is twisted and bent at an angle of 45 degrees and changes its course rightward under the first flat portion 111B. The flexible flat cable 7A is bent further along the right side surface and the top surface of the first flat portion 111B in a generally U-shape, and extends leftward. With this state and configuration, the flexible flat cable 7A is vertically caught and secured between the first pressing portion 111C and the first flat portion 111B. Accordingly, the first holding portion 111 can route the flexible flat cable 7A toward the control circuit board 201 and fix the flexible flat cable 7A.

As shown in FIG. 15, the flexible flat cable 7A is inserted into the first ferrite core 121. The first ferrite core 121 is configured to attenuate noise included in electrical signals transmitted by the flexible flat cable 7A. Then, the flexible flat cable 7A extends above the control circuit board 201, and changes its course downward. A first connector 131, which is flat and used for the flexible flat cable 7A, is disposed in an upper portion of a surface of the control circuit board 201 facing leftward. The flexible flat cable 7A is inserted into the first connector 131 from above and thus is electrically connected to the first connector 131.

As shown in FIG. 2, the upper end of the main unit-side flexible flat cable 7B is connected to the end portion of the main unit-side reading portion 25 on the rear side. The main scanning direction of the main unit-side reading portion 25 is the front-rear direction. As shown in FIG. 15, after extending to the rear side of the main unit 20, the main unit-side flexible flat cable 7B extends downward in a generally straight fashion. At this point, the main unit-side flexible flat cable 7B is disposed in parallel with and to the right of the flexible flat cable 7A. The main unit-side flexible flat cable 7B subsequently changes its course rearward, then changes its course downward before reaching the top of the frame member 20E (FIG. 16).

In FIG. 15, the frame member 20E is omitted for the sake of clarity of the routing layout of the main unit-side flexible flat cable 7B. In FIG. 15, it is assumed that the second holding member 112 disposed in the frame member 20E shown in FIG. 16 is located directly under a portion 721 where the main unit-side flexible flat cable 7B changes its course frontward.

As shown in FIG. 16, the second holding member 112 includes a second step portion 112A, a second flat portion 112B, and a second pressing portion 112C. The second step portion 112A is recessed downward with respect to the top surface of the frame member 20E. The second flat portion 112B is disposed above the second step portion 112A. The second pressing portion 112C is disposed above the second flat portion 112B. The second holding member 112 is disposed at a higher position than the first holding member 111, and arranged alongside of the first holding member 111 in a direction toward the control circuit board 201 (in the left-right direction).

As shown in FIG. 17, the main unit-side flexible flat cable 7B extends over the second step portion 112A toward the front from the portion 721 where the main unit-side flexible flat cable 7B changes its course to the front, then is twisted and bent at an angle 45 degrees and changes its course rightward under the second flat portion 112B. The main unit-side flexible flat cable 7B is bent further along the right side surface and the top surface of the second flat portion 112B in a generally U-shape, and extends leftward. With this state and configuration, the main unit-side flexible flat cable 7B is vertically caught and secured between the second pressing portion 112C and the second flat portion 112B. Accordingly, the second holding portion 112 can route the main unit-side flexible flat cable 7B toward the control circuit board 201 and fix the main unit-side flexible flat cable 7B.

The main unit-side flexible flat cable 7B extends to the left from the second holding member 112 and runs parallel to the flexible flat cable 7A to the left in a state where the flat cables 7A and 7B overlap each other vertically (in the direction of thickness of the flat cables 7A and 7B). At this point, as the second holding member 112 is disposed at a position higher than the first holding member 111, a space between the flexible flat cable 7A and the main unit-side flexible flat cable 7B can be maintained in the thickness direction (vertically), and thus contact between the flat cables 7A and 7B can be prevented. If the first pressing portion 111C has sufficient thickness, the main unit-side flexible flat cable 7B may be placed on the top of the first pressing portion 111C. Thus, even with this arrangement, the vertical space between the flat cables 7A and 7B can be reliably maintained.

As shown in FIG. 15, the main unit-side flexible flat cable 7B is inserted into the second ferrite core 122. The second ferrite core 122 is configured to attenuate noise included in the electrical signals transmitted by the main unit-side flexible flat cable 7B. As the second ferrite core 122 is disposed on top of the first ferrite core 121, the space between the flat cables 7A and 7B can be reliably maintained in the thickness direction (vertically), and the flat cables 7A and 7B can be prevented from contacting each other. Both of the first and second ferrite cores 121 and 122, which are used to reduce noise, serve as the contact prevention mechanism, thereby simplifying the structure of the apparatus.

The main unit-side flexible flat cable 7B extends above the control circuit board 201, and changes its course downward. A second connector 132, which is flat and used for the main unit-side flexible flat cable 7B, is disposed in an upper portion of the surface of the control circuit board 201 facing leftward and spaced apart from the first connector 131 downwardly. The main unit-side flexible flat cable 7B is inserted into the second connector 132 sideways while being bent in a generally L-shape and thus is electrically connected to the second connector 132. The main unit-side flexible flat cable 7B may be inserted into the second connector 132 from below to above. In one or more arrangements, the second connector 132, as illustrated in FIGS. 15 and 16, may be disposed substantially parallel to the first connector 131.

As shown in FIG. 15, a starting point L1 of an overlap section between the flexible flat cable 7A and the main unit-side flexible flat cable 7B corresponds to a location/point at which the flexible flat cable 7A extends downward from the reading portion 24 in a generally straight fashion and then makes a turn in a horizontal direction that is parallel to the rotation axis R1 (in the left-right direction), or a location/position at which the flexible flat cable 7A is held by the first holding portion 111. An ending point L2 of the overlap section is a location where the flexible flat cable 7A is inserted into the first connector 131. In this embodiment, both flat cables 7A and 7B are connected as described above, to shorten the overlap section from L1 to L2. The first and second connectors 131 and 132 are spaced at a predetermined distance apart and the flat cables 7A and 7B are inserted into the respective connectors 131 and 132 in different directions. Thus, at the ending point L2, the flat cables 7A and 7B can be connected to the respective connectors 131 and 132 while maintaining a space between the flat cables 7A and 7B in the thickness direction (in the left-right direction). Accordingly, when the flat cables 7A and 7B are inserted into the respective connectors 131 and 132, the cables 7A and 7B are unlikely to obstruct each other. Thus, the flat cables 7A and 7B can be easily inserted into the respective connectors 131 and 132.

As shown in FIGS. 2, 3, 7, and 15, a wiring cable 7C is disposed between the ADF 11 and the main unit 20. The wiring cable 7C is configured to electrically connect the feeder 42 of the ADF 11 and the control circuit board 201 of the main unit 20. The wiring cable 7C is also configured to transmit a control signal from the control circuit board 201 to the drive source 99 of the feeder 42 and transmit a detection signal of a document detection sensor included in the feeder 42 to the control circuit board 201.

As shown in FIG. 3, the upper end of the wiring cable 7C is connected to a location which is on the left side of the drive source 99 and apart from the reading portion 24 and the main unit-side reading portion 25. As shown in FIGS. 3 and 15, the wiring cable 7C is routed downward along the inner wall of the left side surface 20B of the main unit 20 and apart from the flexible flat cable 7A and the main unit-side flexible flat cable 7B. Wiring cable 7C is further connected to the control circuit board 201. The wiring cable 7C is electrically connected to the control circuit board 201 at a location apart from the first and second connectors 131 and 132. In other words, as shown in FIG. 3, when viewed from the rear side of the multifunction apparatus 10, the wiring cable 7C is routed on a side close to the left side surface 20B, which is closer to the reading portion 24 than the main unit-side reading portion 25, and spaced apart from the flexible flat cable 7A and the main unit-side flexible flat cable 7B. Thus, even if noise occurs in the wiring cable 7C on the feeder 42 side, the flexible flat cable 7A and the main unit-side flexible flat cable 7B may be rendered insensitive (or less sensitive) to the noise. In addition, the route path of the wiring cable 7C on the feeder 42 side can be shortened.

In the multifunction apparatus 10, the control circuit board 201 is disposed as described above to narrow the width of the apparatus 10. As shown in FIG. 3, when viewed from the rear side of the multifunction apparatus 10, the flexible flat cable 7A is disposed closer to a flat surface P, which extends along and parallel to the control circuit board 201, than is the hinge member 49L. In FIG. 3, the flexible flat cable 7A is shown from one end connected to the reading portion 24 to the portion 711 where the flexible flat cable 7A changes its course frontward. In addition, the flexible flat cable 7A extends vertically straightly between the ADF 11 and the main unit 20. Thus, the twisting and bending portions of the flexible flat cable 7A can be reduced in the routing path from the reading portion 24 of the ADF 11 to the control circuit board 201 of the main unit 20.

The reading portion 24 and the control circuit board 201 are disposed close to each other and the flexible flat cable 7A is disposed straightly between the reading portion 24 and the control circuit board 201. Thus, using the above described arrangement, the routing path of the flexible flat cable 7A can be shortened.

Further, using aspects described above, the multifunction apparatus 10 can reduce damage to the flexible flat cable 7A such as breaks and noise, and accordingly reduce irregularity in an image during image reading process and image forming process.

In the multifunction apparatus 10, the reading portion 24 and the flexible flat cable 7A connected to the reading portion 24, and the main unit-side reading portion 25 and the main unit-side flexible flat cable 7B connected to the main unit-side reading portion 25 are arranged close to the control circuit board 201, and thus routing paths of both the flat cables 7A and 7B can be shortened. With this arrangement, in the routing paths, the flat cables 7A and 7B can be held and positioned only by the first and second holding members 111 and 112. Thus, the apparatus can be simplified in structure.

In the multifunction apparatus 10, the reading portion 24 includes a contact image sensor extending in the front-rear direction that is perpendicular to the rotation axis R1. As shown in FIG. 9, one end of the flexible flat cable 7A is connected to the end on the rear side of the reading portion 24. Thus, the routing path of the flexible flat cable 7A can be shortened and noise in an output signal of the reading portion 24 transmitted by the flexible flat cable 7A can be reduced and/or minimized reliably.

The multifunction apparatus 10 includes two reading portions 24 and 25 and is configured to read both surfaces of a document. If no measures are taken, the flexible flat cable 7A and the main unit-side flexible flat cable 7B are likely to cross each other and the routing layout may become complicated. In particular, if any measures are not taken in the multifunction apparatus 10 where the ADF 11 including the reading portion 24 pivots or moves up or down with respect to the main unit 20, the routing path of the flexible flat cable 7A may become complicated in the vicinity of the rotation axis R1 and the flexible flat cable 7A may sustain damage such as breakage or result in noise due to being pulled or bent when the ADF 11 pivots or moves up or down. In the multifunction apparatus 10, however, the flexible flat cable 7A is routed as described above, thereby reducing and/or minimizing a tendency to cross the flexible flat cable 7A and the main unit-side flexible flat cable 7B. Such an arrangement further simplifies the routing layout of the cables 7A and 7B in apparatus 10. In addition, even when the ADF 11 pivots or moves up or down around the rotation axis R1, the flexible flat cable 7A is unlikely to sustain the damage such as breakage, by which the advantageous effect of the invention can be obtained.

In the multifunction apparatus 10, as the contact prevention mechanism, the first and second holding members 111 and 112 and the first and second ferrite cores 121 and 122 prevent the flat cables 7A and 7B from contacting each other in the overlap section (e.g., from L1 to L2). Thus, the flat cables 7A and 7B are more unlikely to sustain damage such as noise in the signals transmitted by the flat cables 7A and 7B, attributing to contact therebetween. Irregularity in image data of a document may also be reliably prevented.

In the multifunction apparatus 10, the rib 301 of the guide unit 300 holds the generally U-shaped slack portion 700 of the flexible flat cable 7A. Thus, even when the flexible flat cable 7A is pulled with pivotal or vertical movement of the ADF 11, the generally U-shaped slack portion 700 can absorb the positional change in the routing path of the flexible flat cable 7A and prevent excessive tension on the flexible flat cable 7A. In addition, the generally U-shaped slack portion 700 can reduce a tendency to cause the flexible flat cable 7A to be twisted or bent excessively. Thus, the flexible flat cable 7A can follow the pivotal or vertical movement of the ADF 11 reliably. As a result, the flexible flat cable 7A is unlikely to sustain damage such as break or noise in a signal transmitted by the flexible flat cable 7A and thus irregularity in image data of a document can be reliably prevented.

Although an illustrative embodiment and examples of modifications of the present invention have been described in detail herein, the scope of the invention is not limited thereto. It will be appreciated by those skilled in the art that various modifications may be made without departing from the scope of the invention. Accordingly, the embodiment and examples of modifications disclosed herein are merely illustrative. It is to be understood that the scope of the invention is not to be so limited thereby, but is to be determined by the claims which follow.

What is claimed is:

1. An image reading apparatus comprising:
    a main unit including:
        a processing portion; and
        a guide portion;
    an openable unit connected to the main unit such that the openable unit is pivotable around a rotation axis and movable in an up and down direction relative to the main unit, wherein the openable unit is movable in the up and down direction separately from pivoting around the rotation axis, the openable unit including:
        a document tray configured to receive placement of a document;
        a feeder configured to feed a document placed on the document tray along a feed path; and
        a reading portion disposed facing the feed path and configured to read an image of the document passing through the feed path; and
    a flexible flat cable configured to electrically connect the reading portion of the openable unit and the processing portion of the main unit,
    wherein the guide portion is configured to guide the flexible flat cable such that the flexible flat cable follows pivotal and vertical movements of the openable unit, and
    wherein the guide portion includes a rib configured to fix a predetermined portion of the flexible flat cable and to hold a slacked portion of the flexible flat cable in a generally U-shape, wherein the slacked portion is located along the flexible flat cable between the predetermined portion of the flexible flat cable fixed at the rib and a portion of the flexible flat cable disposed within the openable unit.

2. The image reading apparatus according to claim 1, wherein the reading portion is configured to read an image of a first surface formed on the document passing through the feed path,
    wherein the main unit includes a main unit-side reading portion facing the feed path, and wherein the main unit-side reading portion is configured to read an image formed on a second surface of the document passing through the feed path, wherein the second surface is opposite to the first surface of the document, and
    wherein the processing portion is configured to perform processes relating to image data for images formed on the first and second surfaces of the document based on an output signal of the reading portion and an output signal of the main unit-side reading portion.

3. The image reading apparatus according to claim 1, wherein the guide portion includes a space holding portion configured to hold the flexible flat cable and maintain a predetermined distance between a pair of generally straight portions of the flexible flat cable, wherein the pair of generally straight portions are opposite to each other above, in the up and down direction, a curved portion of the generally U-shaped slacked portion, and wherein a curvature of the curved portion equals or exceeds a predetermined curvature.

4. The image reading apparatus according to claim 3, wherein the guide portion is configured to:
    fix, at the rib, an upper end of a first generally straight portion of the generally straight portions of the flexible flat cable, wherein the first generally straight portion is positioned by the guide portion to be closer to the processing portion than a second generally straight portion, and
    raise or lower the second generally straight portion while maintaining a shape of the curved portion of the flexible flat cable when the flexible flat cable is pulled by following the movement of the openable unit, wherein the second generally straight portion is positioned by the guide portion to be closer to the openable unit than the first generally straight portion, and wherein an antistatic member covers a portion of the flexible flat cable on a side closer to the second generally straight portion than to the first generally straight portion, wherein the portion is exposed when the openable unit moves vertically.

5. The image reading apparatus according to claim 1, wherein the guide portion includes an escape portion formed on a surface opposite to, in a direction perpendicular to the direction of the rotation axis, the flexible flat cable and a lower end of the openable unit disposed on a side having the rotation axis when the openable unit covers a top surface of the main unit, wherein the flexible flat cable and the lower end of the openable unit disposed on the side having the rotation axis enter the escape portion when the openable unit exposes the top surface of the main unit, and wherein the lower end of the openable unit disposed on the side having the rotation axis integrally includes a cover portion, wherein the cover portion is disposed between the surface and the flexible flat cable, and is configured to cover the flexible flat cable from an open side of the openable unit when the openable unit exposes the top surface of the main unit.

6. The image reading apparatus according to claim 1, wherein the main unit includes an opening, wherein the guide portion is connected to the openable unit via the flexible flat cable fixed to the rib, and wherein, when the openable unit is attached to the main unit, the opening receives the guide portion and the guide portion is movable, with the movement of the openable unit, at least partially into and at least partially out of the opening in the up and down direction.

7. The image reading apparatus according to claim 6, wherein, when viewed from a direction perpendicular to the direction of the rotation axis, one side of the guide portion is exposed.

8. An image reading apparatus comprises:
a main unit including:
 a main unit-side reading portion;
 a processing portion; and
 a guide portion;
an openable unit connected to the main unit such that the openable unit is pivotable around a rotation axis and movable in an up and down direction relative to the main unit, wherein the openable unit is movable in the up and down direction separately from pivoting around the rotation axis, the openable unit including:
 a document tray configured to receive placement of a document; and
 a feeder configured to feed a document placed on the document tray along a feed path; and
a flexible flat cable configured to electrically connect the openable unit and the processing portion of the main unit;
wherein the main unit-side reading portion is disposed facing the feed path and configured to read an image of a document passing through the feed path,
wherein the guide portion is configured to guide the flexible flat cable such that the flexible flat cable follows pivotal and vertical movements of the openable unit, and
wherein the guide portion includes a rib configured to fix a predetermined portion of the flexible flat cable and to hold a slacked portion of the flexible flat cable in a generally U-shape, wherein the slacked portion is located along the flexible flat cable between the predetermined position of the flexible flat cable fixed at the rib and a portion of the flexible flat cable disposed within the openable unit.

9. The image reading apparatus according to claim 8, wherein the guide portion includes a space holding portion configured to hold the flexible flat cable and to maintain a predetermined distance between a pair of generally straight portions, wherein the generally straight portions are opposed to each other above, in the up and down direction, a curved portion of the generally U-shaped slacked portion, and wherein a curvature of the curved portion equals or exceeds a predetermined curvature.

10. The image reading apparatus according to claim 9, wherein the guide portion is configured to:
 fix, at the rib, an upper end of a first generally straight portion of the generally straight portions of the flexible flat cable, wherein the first generally straight portion is positioned by the guide portion to be closer to the processing portion than a second generally straight portion disposed opposite to the first generally straight portion; and
 raise or lower the second generally straight portion while maintaining a shape of the curved portion of the flexible flat cable, when the flexible flat cable is pulled by following the movement of the openable unit, wherein the second generally straight portion is positioned by the guide portion to be closer to the openable unit than the first generally straight portion, and wherein an antistatic member covers a portion of the flexible flat cable that is on a side closer to the second generally straight portion than to the first generally straight portion, wherein the portion is exposed when the openable unit moves vertically.

11. The image reading apparatus according to claim 8, wherein the guide portion includes an escape portion formed on a surface opposite to, in a direction perpendicular to the direction of the rotation axis, the flexible flat cable and a lower end of the openable unit disposed on a side having the rotation axis when the openable unit covers a top surface of the main unit, wherein the flexible flat cable and the lower end of the openable unit disposed on the side having the rotation axis enter the escape portion when the openable unit exposes the top surface of the main unit, and wherein the lower end of the openable unit disposed on the side having the rotation axis integrally includes a cover portion, wherein the cover portion is disposed between the surface and the flexible flat cable, and is configured to cover the flexible flat cable from an open side of the openable unit when the openable unit exposes the top surface of the main unit.

12. The image reading apparatus according to claim 8, wherein the main unit includes an opening, wherein the guide portion is connected to the openable unit via the flexible flat cable fixed to the rib, and wherein, when the openable unit is attached to the main unit, the opening receives the guide portion and the guide portion is movable, with the movement of the openable unit, at least partially into and at least partially out of the opening in the up and down direction.

13. The image reading apparatus according to claim 12, wherein, when viewed from a direction perpendicular to the direction of the rotation axis, one side of the guide portion is exposed.

* * * * *